United States Patent
Worden et al.

(10) Patent No.: US 11,148,689 B2
(45) Date of Patent: Oct. 19, 2021

(54) VEHICLE MONITORING SYSTEM

(71) Applicant: General Electric Company, Schenectady, NY (US)

(72) Inventors: Bret Dwayne Worden, Lawrence Park, PA (US); Ajith Kumar, Erie, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 586 days.

(21) Appl. No.: 15/916,823

(22) Filed: Mar. 9, 2018

(65) Prior Publication Data

US 2018/0297619 A1    Oct. 18, 2018

Related U.S. Application Data

(60) Provisional application No. 62/486,059, filed on Apr. 17, 2017.

(51) Int. Cl.

| B61K 9/12 | (2006.01) |
|---|---|
| B61L 15/00 | (2006.01) |
| G01M 17/10 | (2006.01) |
| G01P 3/44 | (2006.01) |
| G01P 3/56 | (2006.01) |

(Continued)

(52) U.S. Cl.
CPC .......... B61K 9/12 (2013.01); B61C 9/50 (2013.01); B61L 15/0072 (2013.01); B61L 15/0081 (2013.01); B61L 25/021 (2013.01); G01M 17/10 (2013.01); G01P 3/44 (2013.01); G01P 3/481 (2013.01); G01P 3/56 (2013.01); G01P 3/443 (2013.01)

(58) Field of Classification Search
CPC ......... B61K 9/12; B61C 9/50; B61L 15/0072; B61L 15/0081; B61L 25/021; G01M 17/10; G01P 3/44; G01P 3/481; G01P 3/56

USPC .......................................................... 701/19
See application file for complete search history.

(56) References Cited

U.S. PATENT DOCUMENTS

| 9,728,016 B2 | 8/2017 | Kumar et al. | |
|---|---|---|---|
| 2002/0030481 A1* | 3/2002 | Inoue | G01P 3/489 |
| | | | 324/173 |

(Continued)

FOREIGN PATENT DOCUMENTS

CN    1688874 A    10/2005

OTHER PUBLICATIONS

Office Action dated Feb. 3, 2020 for corresponding Chinese patent application No. 201810343068.8 (7 pages).

(Continued)

Primary Examiner — Isaac G Smith
(74) Attorney, Agent, or Firm — Mary D. Lawlor; The Small Patent Law Group LLC

(57) ABSTRACT

The systems and methods described herein include monitoring systems and methods that monitor speeds of a motor of a vehicle represented as a pulse signal indicative of a rotational position of the motor. The systems and methods include receive a pulse signal from a speed sensor coupled to a traction motor. The pulse signal is indicative of a rotational position of the traction motor. The systems and methods include analyze the pulse signal to identify per-revolution signal reoccurrences that meet designated criteria, and determine a defect based on the per-revolution signal reoccurrences that are identified. The defect is one or more of a wheel defect, a bearing defect, or a gear defect.

18 Claims, 16 Drawing Sheets

(51) Int. Cl.
  *B61C 9/50*    (2006.01)
  *B61L 25/02*   (2006.01)
  *G01P 3/481*   (2006.01)

(56) References Cited

U.S. PATENT DOCUMENTS

| | | | | |
|---|---|---|---|---|
| 2003/0093240 | A1* | 5/2003 | Vos | B60C 23/061 |
| | | | | 702/147 |
| 2010/0018299 | A1* | 1/2010 | Takeuchi | F02D 41/009 |
| | | | | 73/114.26 |
| 2013/0013138 | A1* | 1/2013 | Lu | B60L 3/0061 |
| | | | | 701/22 |
| 2014/0039809 | A1* | 2/2014 | Girondin | G01N 29/4463 |
| | | | | 702/39 |
| 2015/0330867 | A1* | 11/2015 | Potts | F16H 57/01 |
| | | | | 73/593 |

OTHER PUBLICATIONS

The English translation of the Office Action dated Feb. 3, 2020 for corresponding Chinese patent application No. 201810343068.8 (10 pages).

* cited by examiner

VEHICLE MONITORING SYSTEM

CROSS-REFERENCE TO RELATED APPLICATIONS

This application claims priority to U.S. Provisional Application No. 62/486,059, filed 17 Apr. 2017, and the entire provisional application of which is incorporated herein by reference.

FIELD

Embodiments of the inventive subject matter described herein relate to monitoring a wheel and/or drivetrain of a vehicle.

BACKGROUND

Rigid wheels of vehicles can develop defects, such as flat spots or segments along the portion of the wheel that rolls along a surface, shells, spalls, scrapes, dents, gouges, grooves, and the like. These types of defects can be referred to as wheel visual damage. These types of damage can be created by wear and tear of the wheel, such as wearing down of the wheel when the wheel is sliding along the surface. For example, the wheels of a rail vehicle can develop flat spots over time due to wearing down of the wheel by the rails on which the rail vehicle travels. Additionally, bearings in motors that rotate the wheels, axle journals that couple wheels to axles, gear teeth within the motor, and/or other components of a drivetrain of a vehicle can become worn down and/or damaged over time.

If severe enough, these types of damage can pose a hazard for the vehicle and the rail. For example, the damage can generate vibratory forces when the wheels rotate along a route, and the forces can damage components of the vehicle. To detect the damage, human operators may visually inspect the vehicle when the vehicle is stopped. But, this type of inspection is subject to human error, can be time consuming, and generally can only be performed when the vehicle is not moving. Some sections of tracks for rail vehicles include strain gauges built into the rails. When a rail vehicle having damage in a wheel travels over the strain gauges, the strain gauges can detect the increased amount of force or vibration generated by the damage. But, this type of detection can be limited due to the need for the rail vehicle to travel to the location of track where the strain gauges are located.

Additionally, bearings in motors that rotate the wheels, axle journals that couple wheels to axles, or other components of a drivetrain of a vehicle can become worn down and/or damaged over time. If severe enough, these problems can pose a hazard for the vehicle. To detect these problems, however, typically operators may inspect the vehicle when the vehicle is stopped. But, this type of inspection also is subject to human error, can be time consuming, and generally can only be performed when the vehicle is not moving.

BRIEF DESCRIPTION

In an embodiment a system (e.g., monitoring system) is provided. The system includes a speed sensor coupled to a traction motor of an axle drive train of a vehicle. The speed sensor is configured generate a pulse signal indicative of a rotational position of the traction motor. The system includes a controller circuit operatively coupled to the speed sensor. The controller circuit is configured to analyze the pulse signal to identify per-revolution signal reoccurrences that meet designated criteria, and to determine the defect based on the per-revolution signal reoccurrences that are identified. The defect is one or more of a wheel defect, a bearing defect, or a gear defect.

In an embodiment a method (e.g., for monitoring an axle drive train) is provided. The method includes receiving a pulse signal from a speed sensor coupled to a traction motor. The pulse signal is indicative of a rotational position of the traction motor. The method includes analyzing the pulse signal to identify per-revolution signal reoccurrences that meet designated criteria, and determining a defect based on the per-revolution signal reoccurrences that are identified. The defect is one or more of a wheel defect, a bearing defect, or a gear defect.

In an embodiment a system (e.g., monitoring system) is provided. The system includes a controller circuit configured to receive a signal from a speed sensor of a vehicle. The signal representative of rotational positions of a motor of the vehicle. The controller circuit is configured to analyze the signal to identify per-revolution signal reoccurrences that meet designated criteria, and to determine the defect based on the per-revolution signal reoccurrences that are identified in one or more of a wheel of the vehicle, a bearing of the vehicle, or a gear of the vehicle based on the signal.

BRIEF DESCRIPTION OF THE DRAWINGS

Reference is now made briefly to the accompanying drawings, in which.

DETAILED DESCRIPTION

One or more embodiments of the inventive subject matter described herein include monitoring systems and methods that monitor speeds of a motor of a vehicle represented as a pulse signal indicative of a rotational position of the motor.

Based on the pulse signals, the monitoring system is configured to identify defects to at least one wheel and/or a drivetrain of the vehicle. The defects can include visual wheel damage, which can include damage such as flat portions along the outer perimeter of one or more of the wheels, shells, spalls, scrapes, dents, gouges, grooves, or the like. The defects optionally can include damage to a drivetrain of the vehicle, such as (but not limited to) damaged bearings of a motor, damaged axle journals, damaged gears, and/or the like. Additionally or alternatively, the defect may include wear, damage, or an undesired manufacturing feature at a given location of a rotational component, which affects operation of the component on a per-revolution basis, but which is not so severe as to preclude the component from operating according to its intended purpose during movement of the vehicle.

In one example of damage and/or defects to wheels, the wheels may be initially or previously round, rigid wheels (e.g., wheels that are forged, cast, or otherwise formed from one or more metals and/or metal alloys) that develop segments along an outer perimeter of the wheels (e.g., along the portion of the wheel that contacts the route being traveled upon) that are no longer around. For example, these segments may be considered "flat" or "out-of-round" when one or more portions of the perimeter of the wheel have a larger or smaller radius than the average radius of the wheel, and/or when the one or more portions of the perimeter of the wheel are flat instead of rounded.

In an embodiment of the monitoring system, damage and/or defects to wheels and/or a drivetrain can be identified with one or more onboard or off-board systems based on a morphology of the pulse signal. For example, the monitoring system may determine defects to the wheels and/or the drivetrain based on peaks of the pulse signal.

Optionally, one or more alerts can be communicated to an onboard and/or off-board location to notify of the damage and/or defect identified by the monitoring system. This notification can be used to notify an upcoming repair or maintenance facility to prepare for replacement or repair of the wheels and/or drivetrain having the damage upon arrival (or relatively soon thereafter) of the vehicle at the facility. Additionally or alternatively, the one or more alerts may automatically adjusts the motor (e.g., speed).

Figure 1:
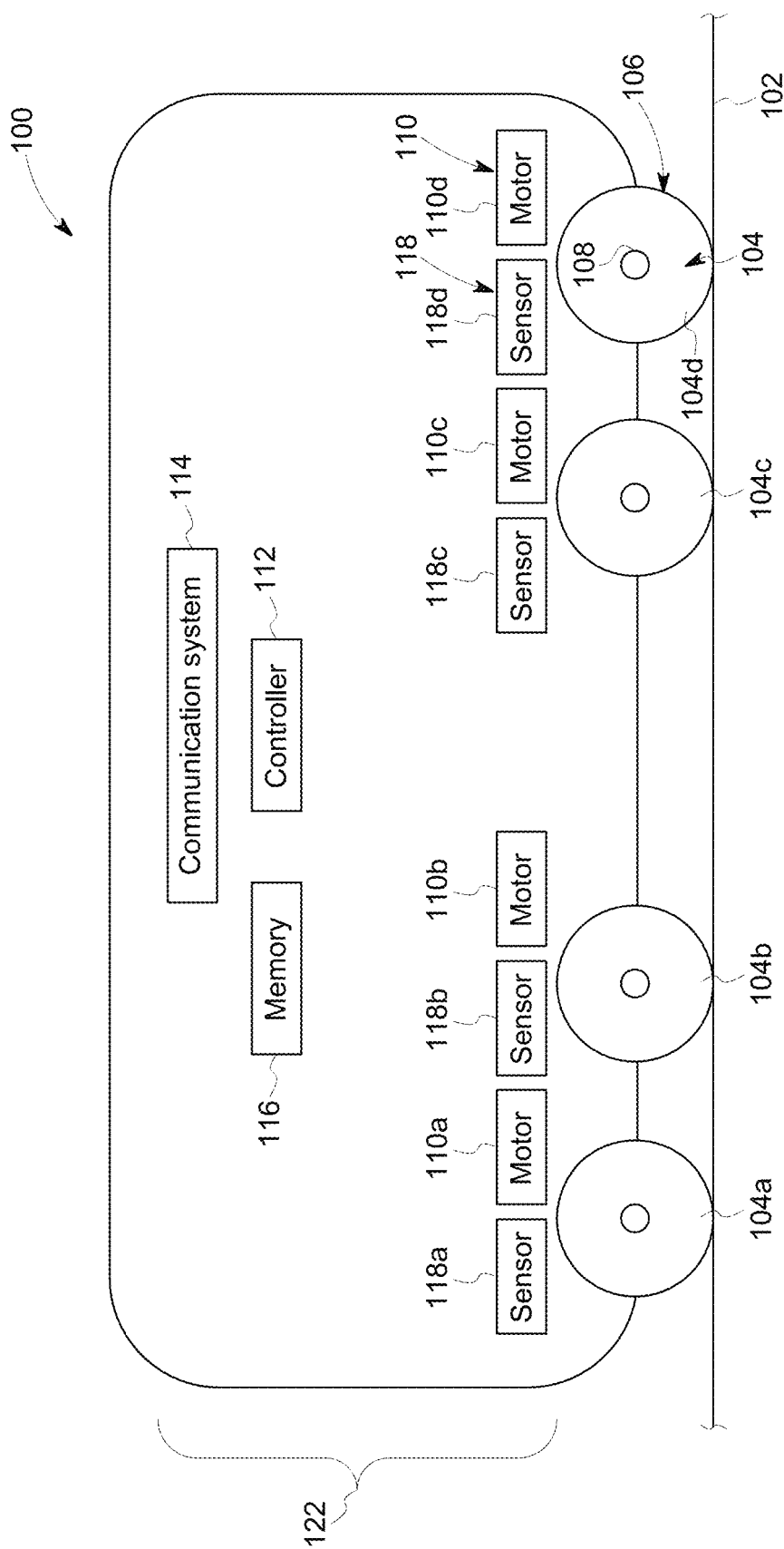
FIG. 1 is a schematic illustration of an embodiment of a monitoring system of a vehicle.

FIG. 1 is a schematic illustration of an embodiment of a monitoring system 122 of a vehicle 100. The vehicle 100 can represent a propulsion-generating vehicle system that generates tractive effort to propel the vehicle 100 along a route 102. In one example, the vehicle 100 may be a rail vehicle such as a locomotive, but alternatively may be another type of vehicle system. For example, the vehicle 100 may be another type of off-highway vehicle (e.g., a vehicle that is not designed and/or not permitted to travel on public roadways), or may be an automobile. The vehicle 100 includes a plurality of wheels 104 (e.g., wheels 104a-d) having outer perimeters 106 that engage the route 102 when the vehicle 100 travels along the route 102. With respect to rail vehicles, the wheels 104 may be rigid wheels having outer perimeters 106 that contact rails of a track. It may be a noted a number and/or arrangement of the wheels 104 can vary from that shown in FIG. 1.

The wheels 104 can be mechanically coupled to an axle drive train having axles 108 and a motor 100 (e.g., 110a-d). For example, the wheels 104 are connected to axles 108 that are rotated by motors 110 (e.g., motors 110a-d) to rotate the wheels 104 and cause propulsion of the vehicle 100. The motors 110 may be configured to rotate the axles 108 with a compliant coupling or connection. The motors 110 may be traction motors. In connection with FIGS. 2A-C, the motors 110 can be separately connected to individual ones of the axles 108 by gears, pinions, and/or the like. It may be noted that one or more of the motors 110 may be connected to two or more of the axles 108.

Figure 2A:
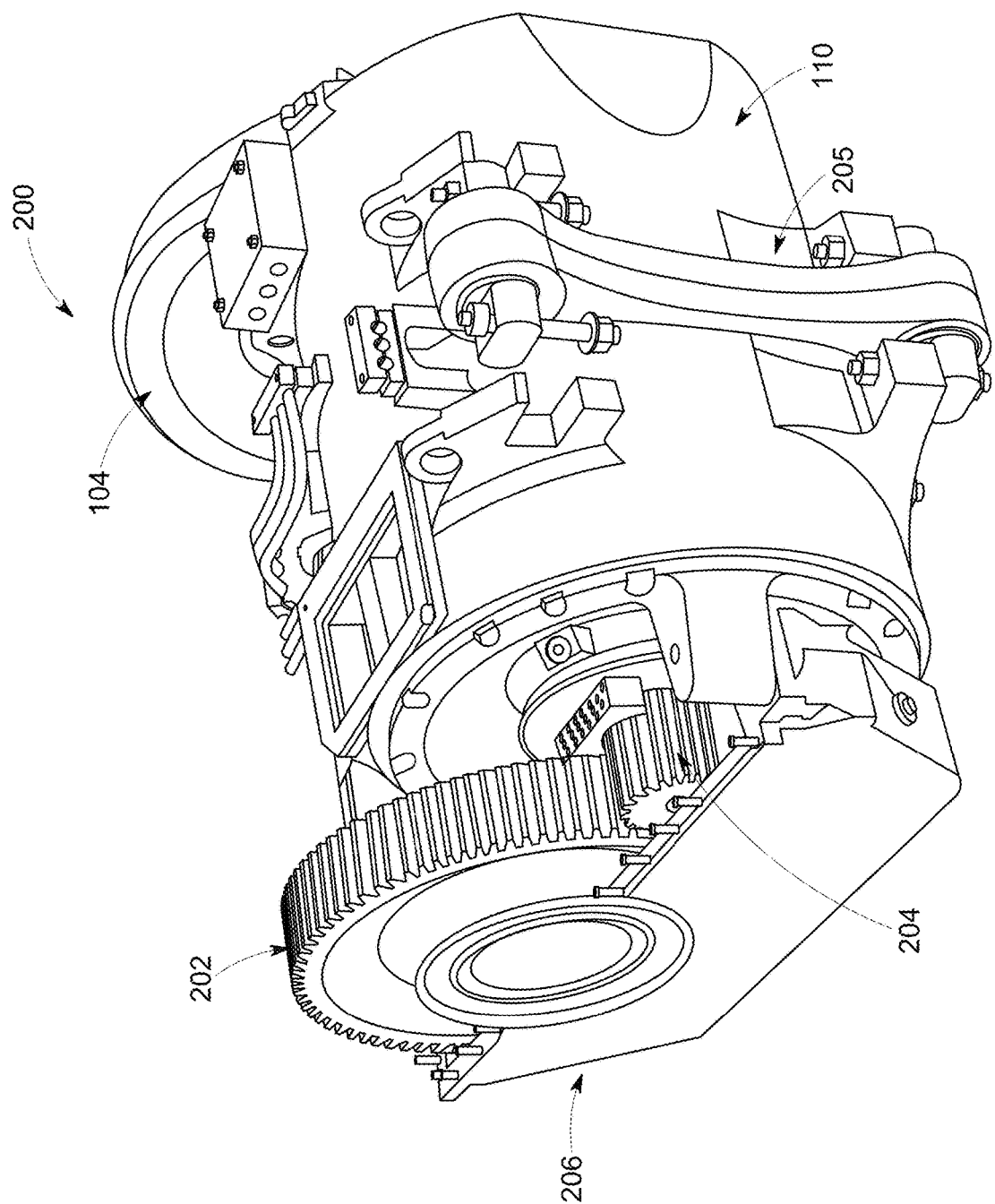
FIG. 2A-B are schematic illustrations of an embodiment of a portion of an axle drive train of the vehicle shown in FIG. 1.
Figure 2B:
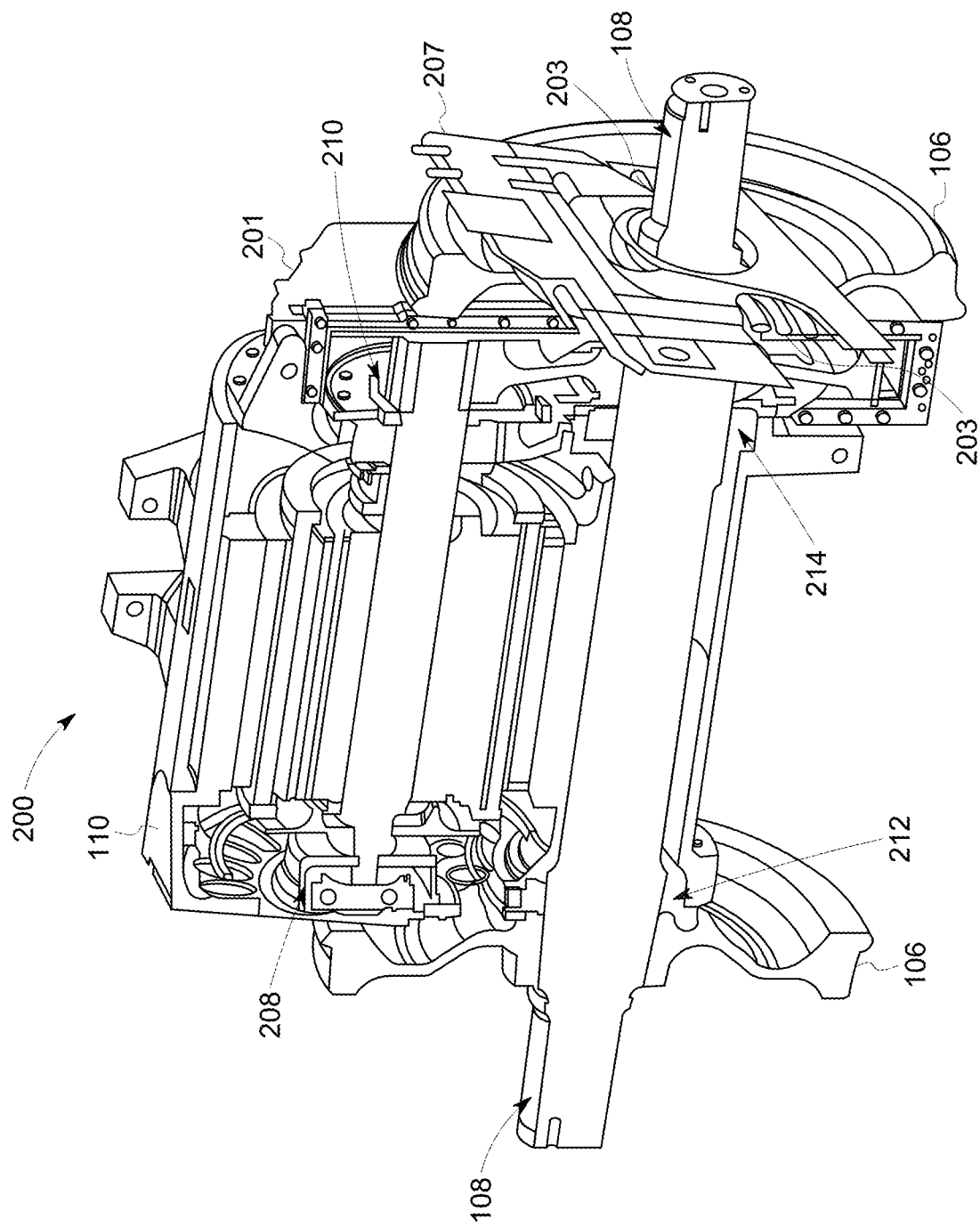
Figure 2C:
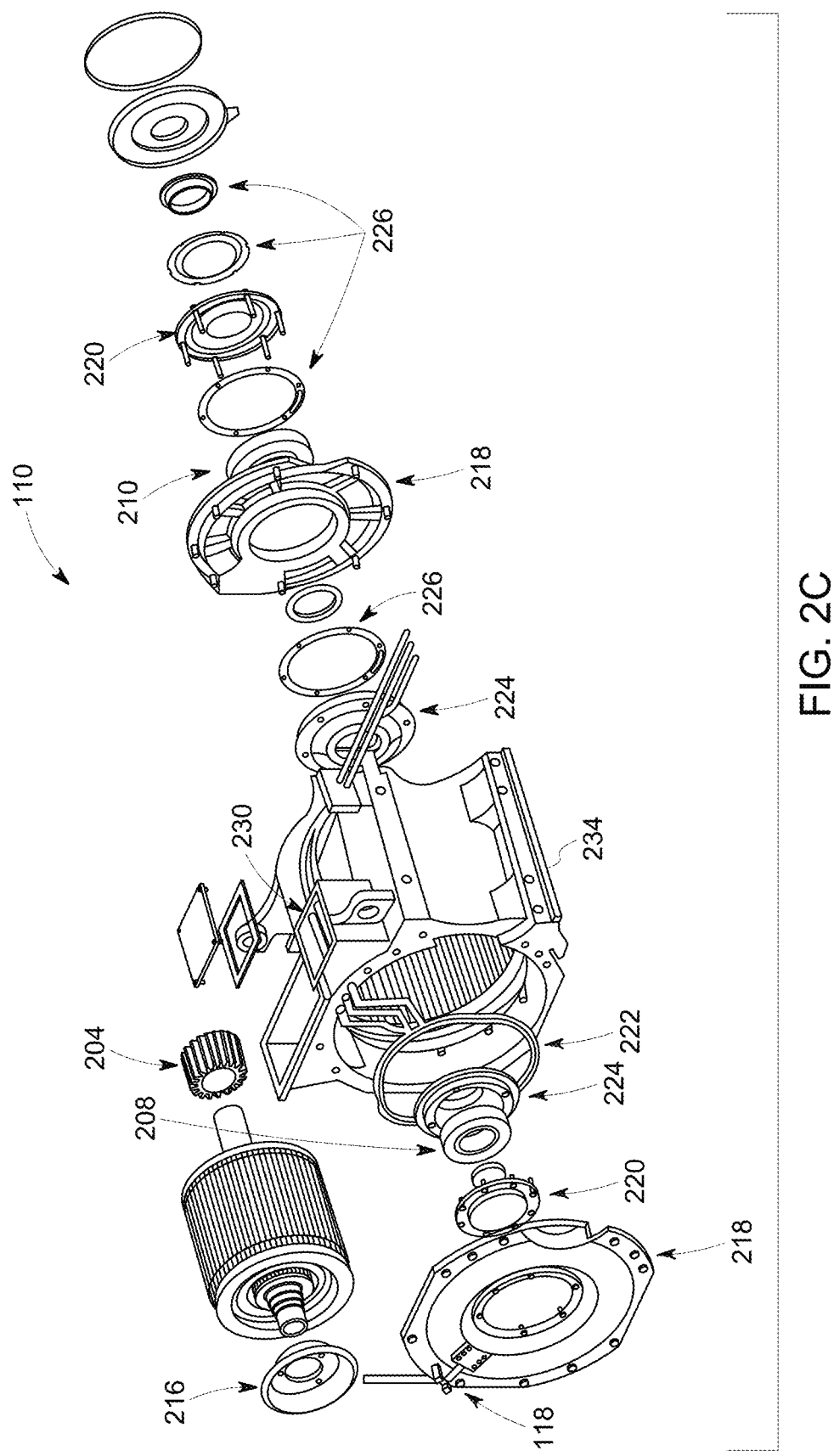
FIG. 2C is an expanded illustration of an embodiment of a motor of the axle drive train shown in FIGS. 2A-B of the vehicle shown in FIG. 1.

FIGS. 2A-C are schematic illustrations of an embodiment of a portion of an axle drive train 200 of the vehicle 100. FIG. 2A illustrates a peripheral view of the axle drive train 200. The axle drive train 200 includes the motor 110 and an aperture 206 for the axles 108. For example, the axles 108 may be positioned within the aperture 206 and coupled to the wheel 104. The motor 110 includes an axle gear 202. The axle gear 202 is mechanically coupled to the axles 108. The axle gear 202 is adjacent to a pinion gear 204, which is operatively coupled together via the gear teeth of the axle gear 202 and the pinion gear 204. The pinion gear 204 is configured to provide a rotational and/or angular movement to the axle gear 202. For example, the pinion gear 204 is mechanically and/or operatively coupled to the motor 110, which generates the rotational and/or angular movement of the pinion gear 204. For example, a motor frame 201 reacts against a bogie frame 207 through a link 205, which may include compliant bushings. Additionally or alternatively, the axles 108 itself is suspended from a bogie frame 207 (FIG. 2B) by way of primary suspension springs 203. The combination of the springs 203, the link 205, the bogie frame 207, and/or the like provide a mechanism for finite transient motor rotor rotation or revolution relative to the motor stator without the need for wheel rotation and/or translation of the vehicle 100 along the route 102.

FIG. 2B illustrates a peripheral view of the axle drive train 200. For example, the axle drive train 200 shown in FIG. 2B includes the axles 108 mechanically coupled to the wheels 104a-d. The axle drive train 200 includes bearings 208 and 210. The bearings 208 and 210 may be motor pinion end bearings. For example, the bearings 208 and 210 may be configured to constrain movement of the pinion gear 204 along one direction. The axle drive train 200 may further include bearings 212 and 214. The bearings 212 and 214 may be rolling bearings. For example, the bearings 212 and 214 may be configured to constrain movement of the axles 108, such as within the aperture 206.

FIG. 2C is an expanded illustration of an embodiment of the motor 110 of the axle drive train 200 of the vehicle 100. For example, the expanded illustration may illustrate the components, such as the gaskets and collars 226, contained within a housing 234 of the motor 110. The motor 110 includes a terminal box 230 configured to electrically and/or operably couple the motor 110 to a controller circuit 112. The motor 110 may include a pair of bearing caps 220 and bearing housing 224. The bearing caps 220 and bearing housing 224 are configured to enclose and protect the bearings 208 and 210. The motor 110 may include a frame head 218 coupled to the housing 234 using a connection rings 222. The frame head 218 is configured to support the axles 108 and the speed sensor 118. The speed sensor 118 is operably coupled to a speed sensor gear 216. For example, the speed sensor 118 is configured to utilize and/or measure changes in a position of the speed sensor gear 216 to determine a rotational position of the rotor of the motor 110, specifically the axle gear 202. The rotational position of the rotor of the motor 110 may be represented as a pulse signal generated by the speed sensor 118. The pulse signal may be an asynchronous electrical waveform. The speed sensor 118 may be configured to oscillate, such as be displaced during the defect due to suspension compliance. For example, when a wheel defect is present the speed sensor 118 may be displaced and/or oscillate when the wheel defect is traversed by the vehicle 100. In another example, when a bearing and/or gear defect is present the speed sensor 118 may be displaced and/or oscillate when the bearing and/or gear defect is traversed by the motor 110.

Returning to FIG. 1, the vehicle 100 includes the controller circuit 112. The controller circuit 112 of the vehicle 100 communicates with the motors 110 to control power, tractive effort, and/or speed at which the vehicle 100 moves along the route 102. The controller circuit 112 is operably and/or conductively coupled to the speed sensors 118. For example, the controller circuit 112 is configured to receive a pulse signal generated by the speed sensors 118. The controller circuit 112 includes or represents one or more hardware circuits or circuitry that includes and/or is connected with one or more processors, microcontrollers, or other electronic logic-based devices that perform operations described herein. The controller circuit 112 can include or be connected with one or more operator input devices, such as levers, pedals, switches, touchscreens, or the like, to receive input from an onboard operator that controls a movement of the vehicle 100. Optionally, the controller circuit 112 can automatically control a movement of the vehicle 100, such as according to a trip plan that dictates operational settings of the vehicle 100 (e.g., speeds, throttle positions, brake settings, power output, or the like). In one aspect, the controller circuit 112 can control the movement of the vehicle 100 according to signals received from an off-board location via a communication system 114. For example, the communication system 114 may receive communication signals through one or more wired and/or wireless connections, where the signals dictate operational settings of the vehicle 100.

The communication system 114 includes transceiver hardware and/or circuitry that can communicate signals with one or more other communication devices. The communication system 114 can include an antenna that wirelessly communicates (e.g., transmits, broadcasts, and/or receives) signals and/or the communication system 114 can be coupled with one or more conductive pathways (e.g., cables, catenaries, rails, or the like) to communicate signals through the conductive pathways.

The vehicle 110 includes a memory 116. The memory 116 includes algorithms, data values, and/or the like utilized by the controller circuit 112 to perform one or more operations described herein. The memory 116 may be a tangible and non-transitory computer readable medium such as flash memory, RAM, ROM, EEPROM, and/or the like.

The controller circuit 112 is operably coupled to the speed sensor 118. The controller circuit 112 is configured to determine a defect based on the pulse signal received from the speed sensor 118. In connection with FIG. 3, the controller circuit 112 is configured to determine a wheel defect, a bearing defect, a gear defect, and/or the like based on the pulse signal.

Figure 3:
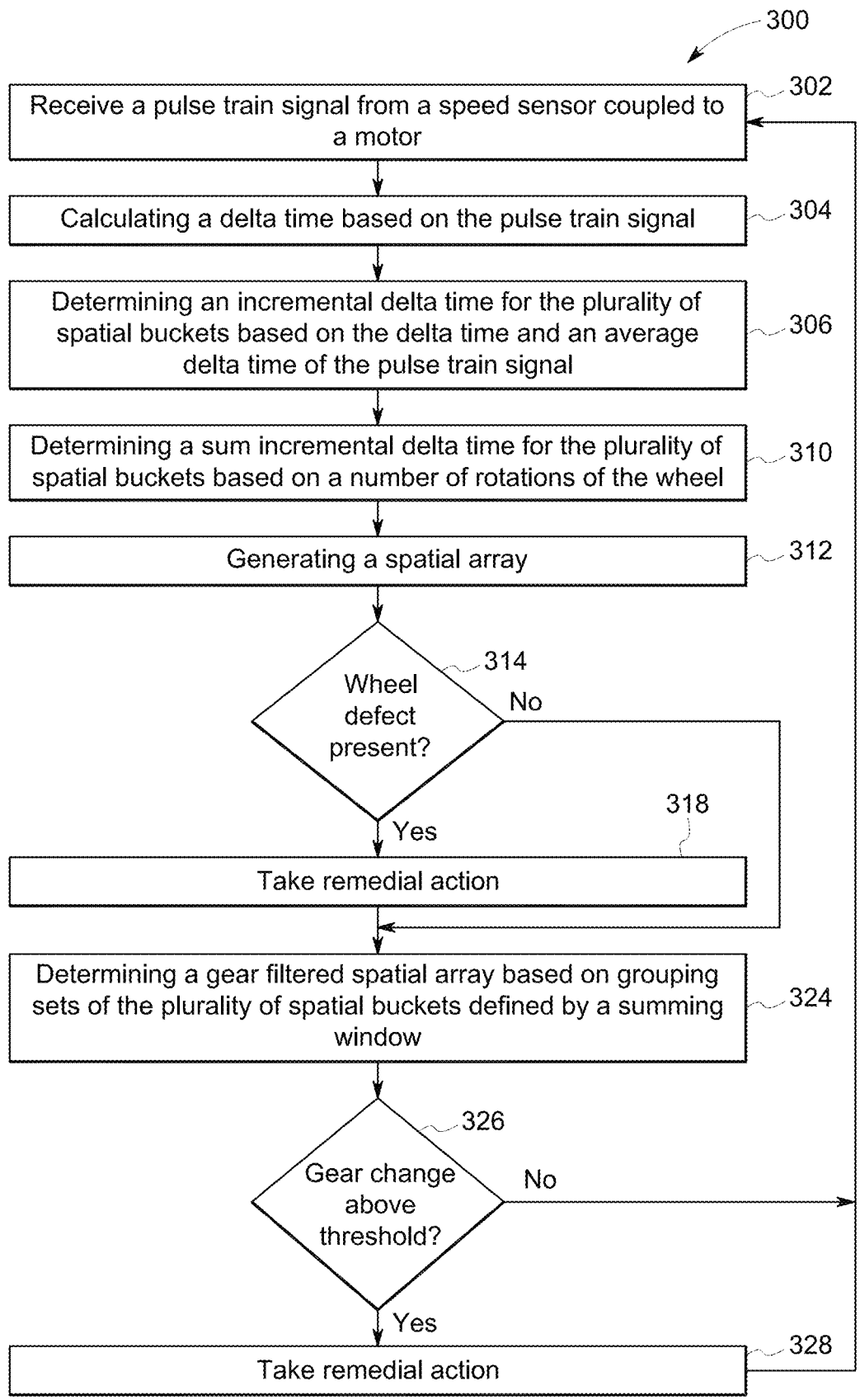
FIG. 3 is a flowchart of an embodiment of a method for monitoring an axle drive train.

FIG. 3 illustrate is a flowchart of an embodiment of a method 300 for monitoring an axle drive train. The method 300, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be used as one or more algorithms to direct hardware to perform one or more operations described herein. It should be noted, other methods may be used, in accordance with embodiments herein.

It may be noted that the method 300 may be repeated concurrently and/or simultaneously for each of the motors 110 and/or axles 108 of the vehicle 100. For example, the controller circuit 112 may be configured to compare multiple axles 108 and/or motors 110. Optionally, the controller circuit 112 may be configured to reject common deviations of the motors 110 and/or axles 108 as potential irregularities along the route 102, and/or other influences not related to a particular axle 108 and/or motor 110. Additionally or alternatively, the controller circuit 112 may identify which of the motors 110 and/or axles 108 of the vehicle 100 include a defect. For example, the controller circuit 112 may be configured to categorize the defects (e.g., the bearings 208, 210, 212, 214, the pinion gear 204, the speed sensor gear 216, the axle gear 202, rotor imbalance, pedestal liner, traction link defect, the wheel 104, and/or the like), which cause a speed deviation signature (e.g., based on the pulse signal 402 of FIG. 4). The speed deviation signature is spatially synchronous to wheel rotation. For example, as described in connection to the method 300, the defect may be recognized by its magnitude sensitivity to the motor torque level.

Figure 4:
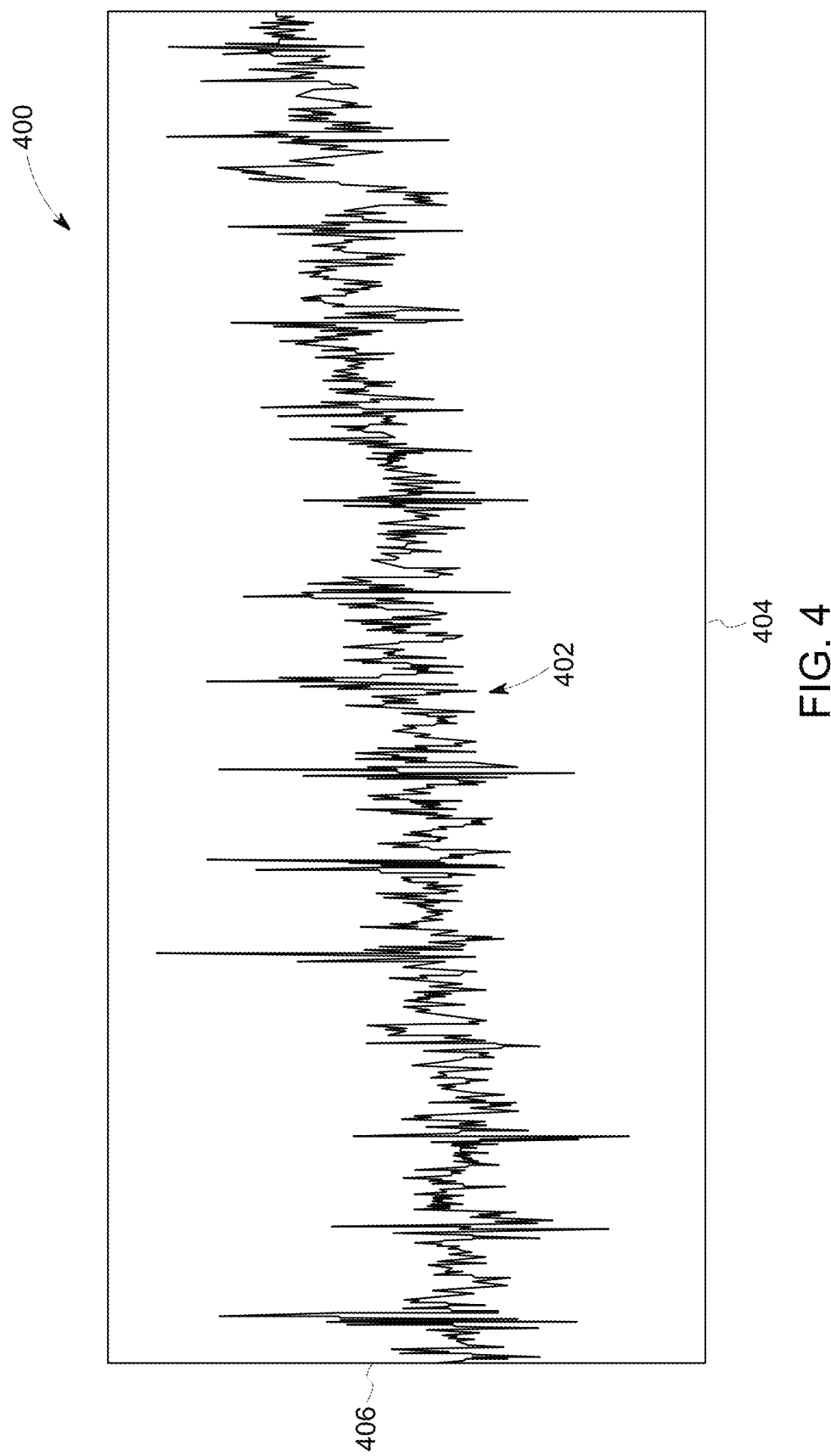
FIG. 4 is a graphical illustration of an embodiment of a pulse signal.

Beginning at 302, the controller circuit 112 may be configured to receive a pulse signal 402 from the speed sensor 118 coupled to a motor 110. FIG. 4 is a graphical illustration 400 of an embodiment of the pulse signal 402. The pulse signal 402 may represent a speed signature of the motor 110 indicative of a rotational position of the motor 110 over time. The pulse signal 402 is shown alongside a horizontal axis 404 representative of time and a vertical axis 406 representative of peaks corresponding to teeth of the axle gear 202. The pulse signal 402 may represent how rapidly the rotor and/or wheel 104 is rotating during movement of the vehicle 100 (shown in FIG. 1) along the route 102 (shown in FIG. 1) with respect to time. For example, the pulse signal 402 can represent the time domain of the rotational speeds of the rotor and/or wheel 104. It may be noted that the controller circuit 112 may receive one or more additional pulse signals 402 obtained for one or more other motors 110. Optionally, the controller circuit 112 may store one or more of the pulse signals 402 in the memory 116.

At 304, the controller circuit 112 may be configured to calculate a delta time based on the pulse signal 402. The delta time may represent an amount of time between one or more teeth of the speed sensor gear 216 shown in FIG. 2C. For example, the axle gear 202 (FIG. 2A) may have 87 teeth. The controller circuit 112 is configured to calculate changes in time between each of the 87 teeth of the speed sensor gear 216 represents changes in peaks of the pulse signal 402. Optionally, the number of teeth for the change in time may be based on a velocity and/or rotor velocity. For example, as the velocity increases, the controller circuit 112 may increase a number of teeth for the change in time. The changes in the delta time may represent defects of the axle drive train. For example, increases in the delta time may represent a wheel defect, a bearing defect, a gear defect, and/or the like. Optionally, the controller circuit 112 may store the delta times in the memory 116.

At 306, the controller circuit 112 may be configured to determine an incremental delta time for a plurality of spatial buckets based on the delta time and an average delta time of the pulse signal 402. For example, the incremental delta time may represent the accumulation of delta times that are spatially distributed within an array defined by the plurality of spatial buckets.

Figure 5A:
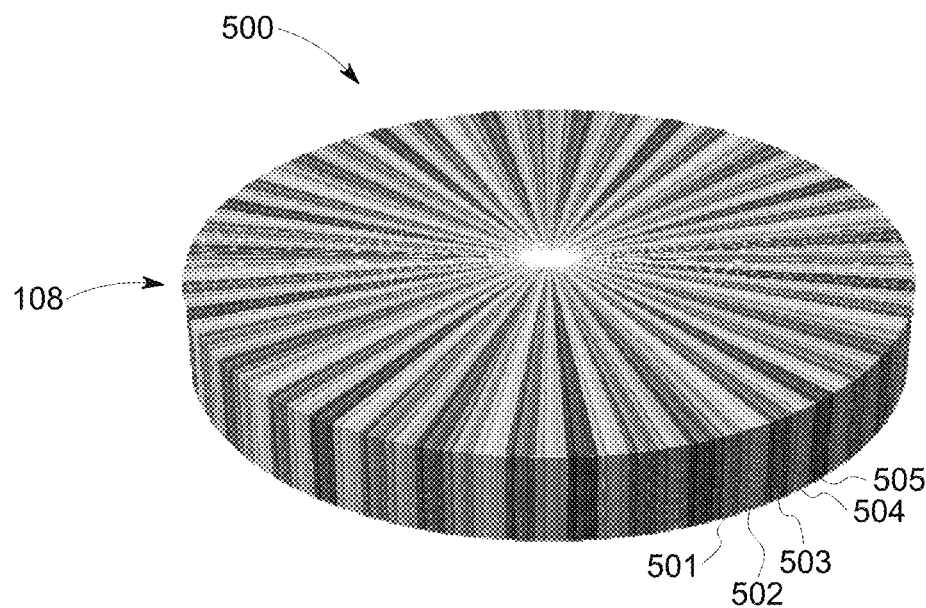
FIG. 5A is an illustration of an embodiment of a wheel of the vehicle subdivided into spatial buckets.

The spatial buckets may represent an angular position of the wheel 104. FIG. 5A is an illustration 500 of an embodiment of the wheel 104 of the vehicle 100 subdivided into spatial buckets (e.g., 501-505). It may be noted that the spatial buckets 501-505 shown in FIG. 5A is illustrative. For example, FIG. 5A illustrates more than five spatial buckets. The spatial buckets 501-505 may represent angular slots and/or angular slices of the wheel 104. For example, the spatial buckets 501-505 may correspond to an angular position of the wheel 104. A number of the spatial buckets 501-505 may be based on a sample rate and/or processing speed of the controller circuit 112. Additionally or alternatively, the number of the spatial buckets 501-505 may be based on a gear ratio and/or multiple of the gears of the axle drive train as well as the number of pulses per revolution provided by the speed sensor 118.

For example, the axle gear 202 (FIG. 2A) may have 87 gear teeth while the pinion gear 204 may have 16 teeth and the speed sensor 118 provides for 192 pulses per motor revolution resulting in 522 spatial buckets of the wheel 104. The 522 spatial buckets around the wheel 104 provide for two-speed sensor pulses per spatial bucket.

Based on the number of spatial buckets, the controller circuit 112 may be configured to partition and/or assign the incremental delta times to each of the spatial buckets. For example, the horizontal axis 404 of the pulse signal 402 may represent a rotation of the rotor of the motor 110 and/or the wheel 104. The controller circuit 112 may divide the horizontal axis 404 and the pulse signal 402 into the corresponding spatial buckets. After a predetermined number of rotations and/or revolutions of the wheel 104, the controller circuit 112 may be configured to determine an average and/or total delta time for each spatial bucket. The average and/or total delta time may include direct defect signature detection and/or filtering or signal processing to identify various drive train defects.

Figure 5B:
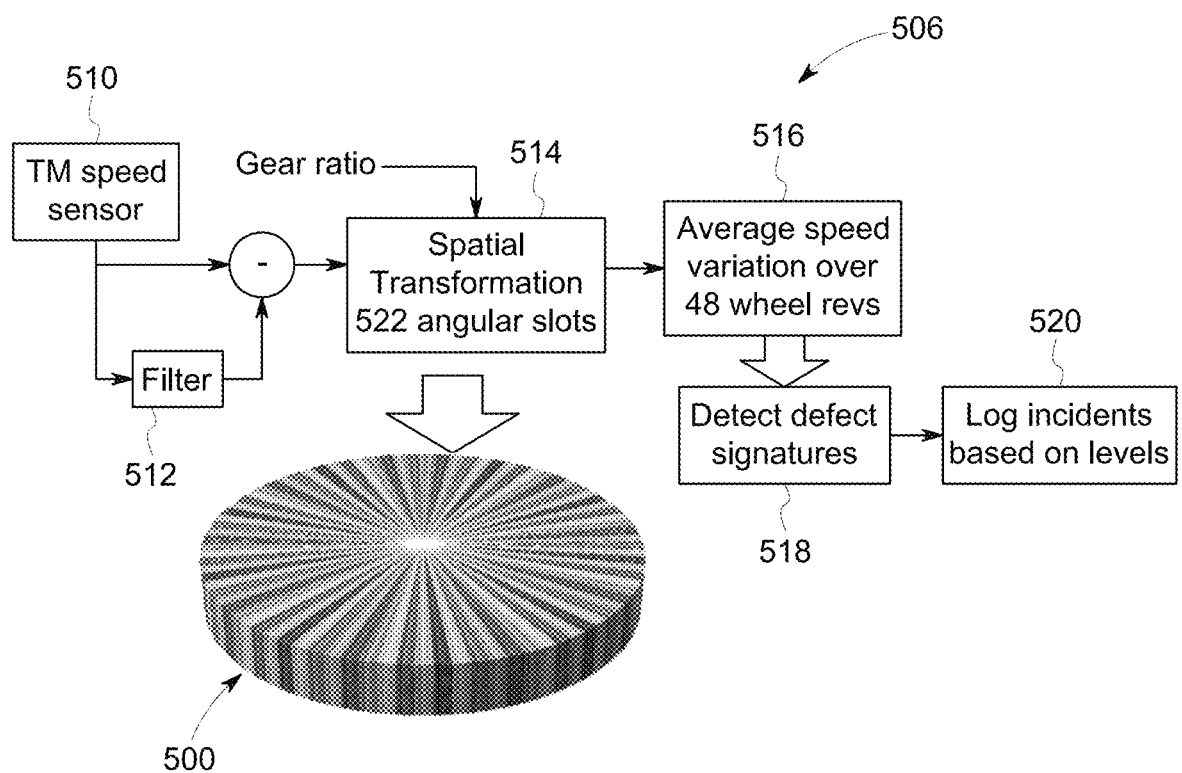
FIG. 5B is an illustration of a flowchart of an embodiment to determine an incremental delta time.

FIG. 5B is an illustration of a flowchart 506 of an embodiment to determine an incremental delta time. For example, the pulse signal represented at 510 is received by the controller circuit 112. The controller circuit 112 may filter 512 the pulse signal. The filter 512 may represent a low pass filter configured to reject acceleration of the vehicle 100 of the pulse signal based on a set threshold such that rapid movement caused by the defect are allowed to pass through the filter 512. At 514, the controller circuit 112 is configured to distribute the delta times among the spatial buckets of the wheel 104. For example, the controller circuit 112 may assign an integral number of spatial buckets or bins across a gear tooth of the motor 110. The motor speed or delta time between angular positions relative to the wheel 104a-d is accumulated by the controller circuit 112 to develop and average the delta times for the spatial buckets.

At 310, the controller circuit 112 may be configured to determine (e.g., sum) incremental delta times for the plurality of spatial buckets based on a number of rotations of the wheel 104a-d. For example, the controller circuit 112 may be configured to add the incremental delta times for a plurality of revolutions (e.g., more than 30 revolutions, 48 revolutions, and/or the like) of the rotor and/or the wheel 104a-d for each of the plurality of spatial buckets. The number of revolutions may be based on a predetermined value stored in the memory 116. In connection with FIG. 5B, the controller circuit 112 may continually store sets of revolutions corresponding to the number of revolutions in the memory 116 at a filter 512. The filter 512 may represent a low pass filter. For example, the filter 512 is configured to not allow slower vehicle acceleration values and/or signals from rapid changes in acceleration based on the wheel defect, the bearing defect, the gear defect, and/or the like based on the pulse signal. The addition of the delta times across the plurality of revolutions may be utilized by the controller circuit to minimize detections of non-defects of the axle drive train. For example, defects on a surface of the route 102 may increase a delta time. Across a plurality of revolutions averaged at 516, the effect of the delta time caused by the surface of the route 102 is reduced and/or minimized with respect to the sum of the incremental delta times of the plurality of spatial buckets.

At 312, the controller circuit 112 may be configured to generate a spatial array 604. The spatial array 604 may be based on the pulse signal 402. For example, the controller circuit 112 may continually add the incremental delta time for each subsequent revolution of the rotor and/or the wheel 104a-d to form the spatial array 604 until the predetermined number of revolutions have been reached (at 518 shown in FIG. 5B). The controller circuit 112 logs incidents based on levels 520 onto the memory 116.

Figure 6:
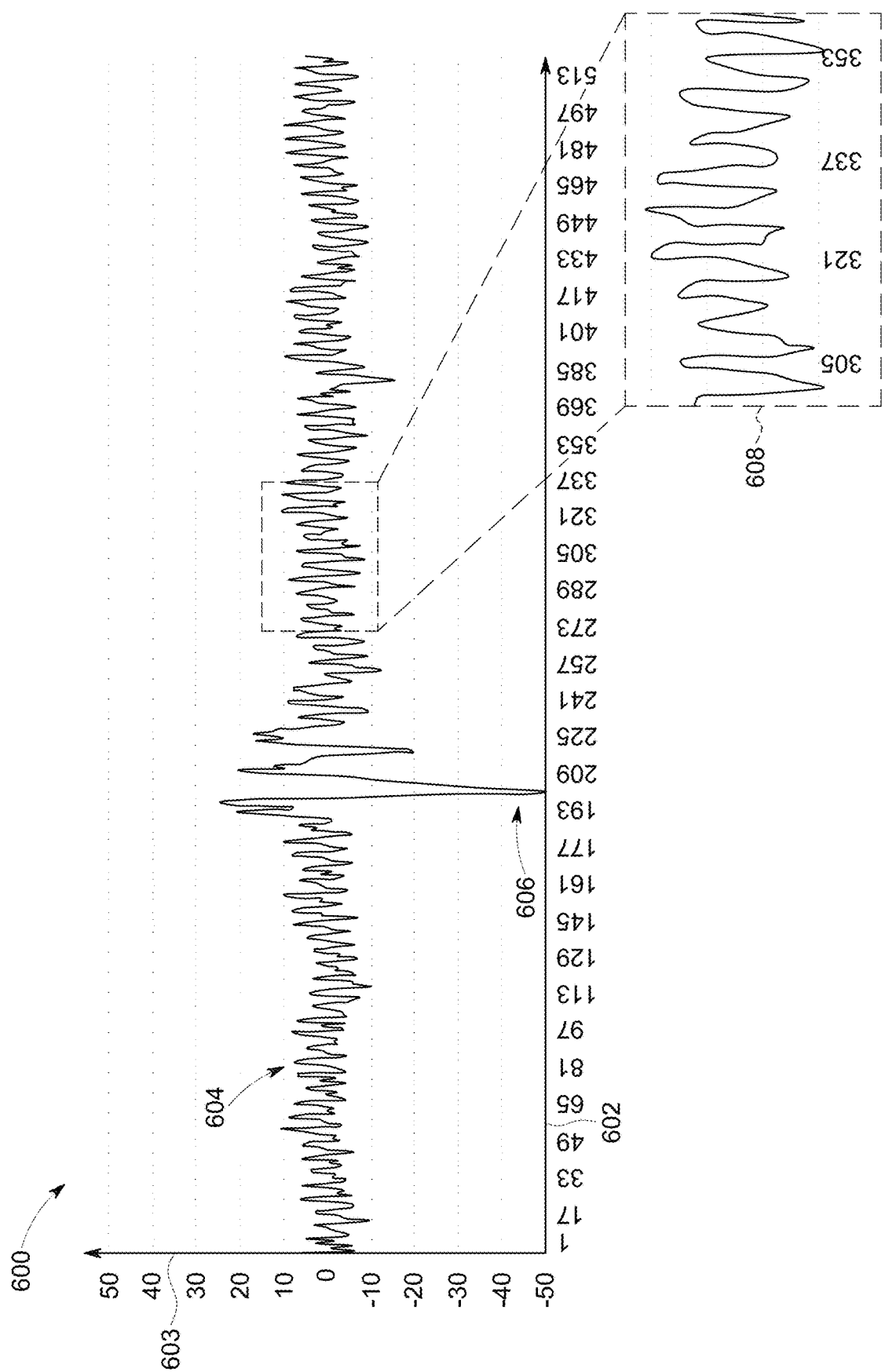
FIG. 6 is a graphical illustration of an embodiment of a spatial array.

FIG. 6 is a graphical illustration 600 of an embodiment of the spatial array 604. The spatial array 604 is shown along a horizontal axis 602 representing the spatial buckets. For example, the horizontal axis 602 may correspond to the plurality of spatial buckets. The vertical axis 603 may represent the sum of the incremental delta times across a plurality of revolutions for each spatial bucket. The vertical axis 603 may represent microseconds. It may be noted amplitudes of the spatial array 604 may be asynchronous across the plurality of spatial buckets represented as noise. For example, a magnified portion 608 of the spatial array 604 illustrates variances in peaks across multiple spatial buckets indicative of a spatially periodic speed disturbance source. The periodic variation within the spatial array 604 may be based on the interaction of the gears within the motor 110 and/or the oscillation of the speed sensor 118.

Figure 7:
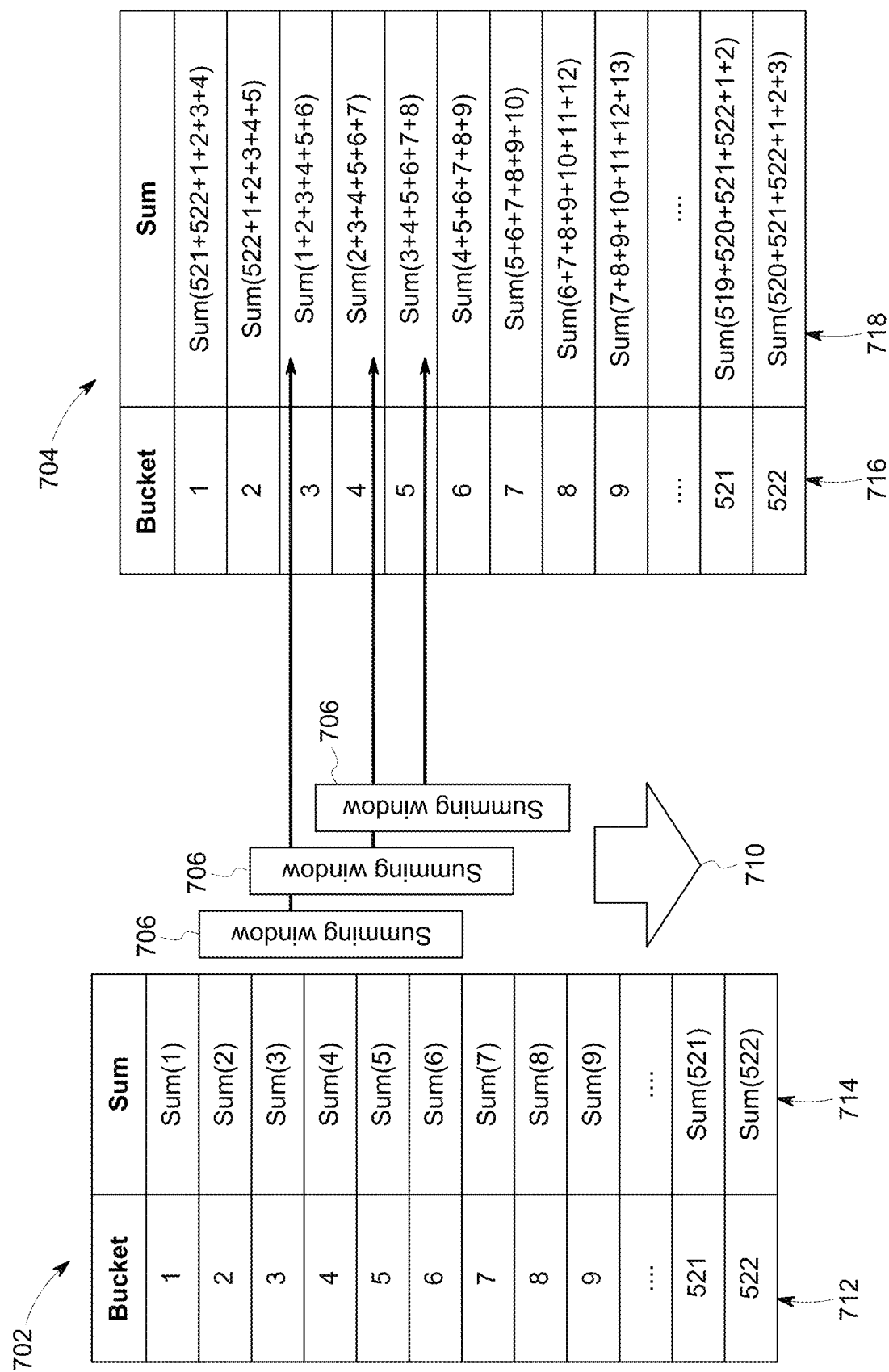
FIG. 7 is an illustration of a summing window to form a gear filtered spatial array.
Figure 8:
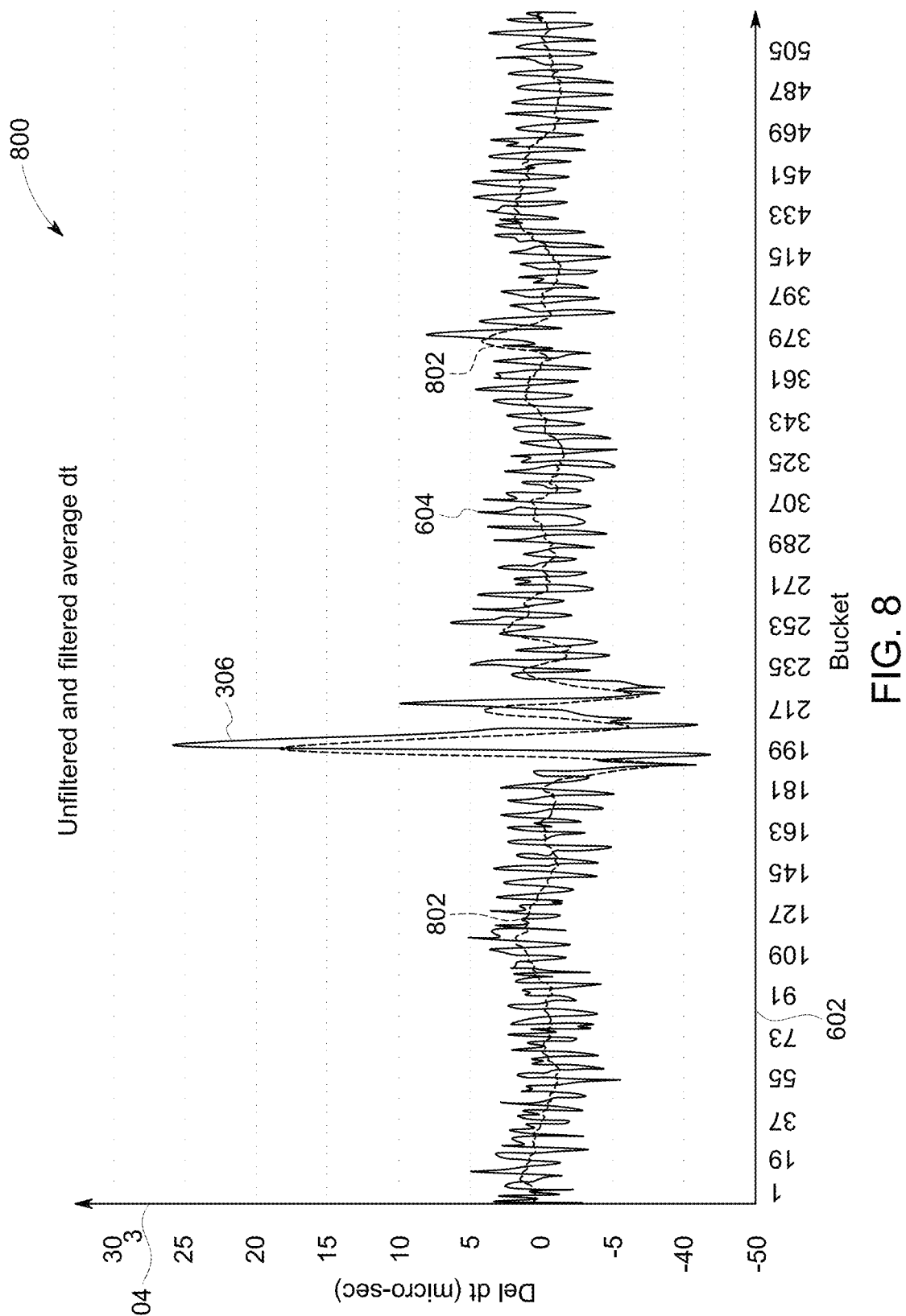
FIG. 8 is a graphical illustration of an embodiment of a gear filtered spatial array.

Additionally or alternatively, the controller circuit 112 may be configured to filter out the "gear noise" of the spatial array 604 to form a gear filtered spatial array 802 (FIG. 8). For example, the controller circuit 112 may be configured to group sets of the plurality of spatial buckets defined by a summing window 706 (FIG. 7). The controller circuit 112 may be configured to sum the incremental delta times of the spatial buckets defined by the summing window 706. The summing window 706 may be based on a number of spatial buckets representing a single tooth of the gear of the axle gear 202. For example, a number of gear teeth are spatially synchronized to a wheel angular position. A number of spatial buckets, such as 522 over a wheel revolution, may result in six buckets for a single axle/pinion gear tooth translation. A size of the summing window 706 may be the gear ratio and/or six spatial buckets indicative of a period contribution of a single gear tooth to the spatial array 604. The period contribution may be filtered out by the controller circuit 112 by applying a summing window averaging to the spatial array 604 corresponding to one or more integral number of gear teeth.

FIG. 7 is an illustration of a summing window 706 to form a gear filtered spatial array 802. A portion of the spatial array 604 is shown within a table 702, which may be stored in the memory 116. For example, column 712 represents the plurality of spatial buckets with an adjacent column 714 that contains the corresponding sum of the incremental delta times. The controller circuit 112 may select a portion of the spatial buckets represented as the summing window 706, and sum of the incremental delta times within the summing window 706. The incremental delta times summed by the controller circuit 112 are stored in a table 704. The table 704 may include a column 716 indicative of a position of the summing window 706 with respect the plurality of spatial buckets. The table 704 includes a column 718 representing a gear filtered spatial value. The table 704 is representative of the gear filtered spatial array 802 shown in FIG. 8.

At an initial position of the summing window 706, the controller circuit 112 may sum the incremental delta times of the spatial buckets 1-6 shown in the table 702. The sum of the incremental delta times calculated by the controller circuit 112 may be stored in the table 704 in the column 718. The controller circuit 112 may successively reposition the summing window 706 to an adjacent bucket in the direction of an arrow 710. For example, the controller circuit 112 may reposition the summing window successively along the spatial buckets. It may be noted that the summing window 706 may be repeated and/or cycled at the end of the table 702, such that the summing window 706 may include spatial buckets at opposing ends of the table 702. For example, the summing window 706 may include the spatial buckets (shown in the column 712) of 521, 522, and 1-4.

FIG. 8 is a graphical illustration 800 of an embodiment of the gear filtered spatial array 802. The graphical illustration 800 may include the gear filtered spatial array 802 and the spatial array 604. The gear filtered array 802 and the spatial array 604 are shown along the horizontal axis 602 and the vertical axis 603. It may be noted, the gear noise of the spatial array 604 is removed relative to the gear filtered spatial array 802.

Figure 9:
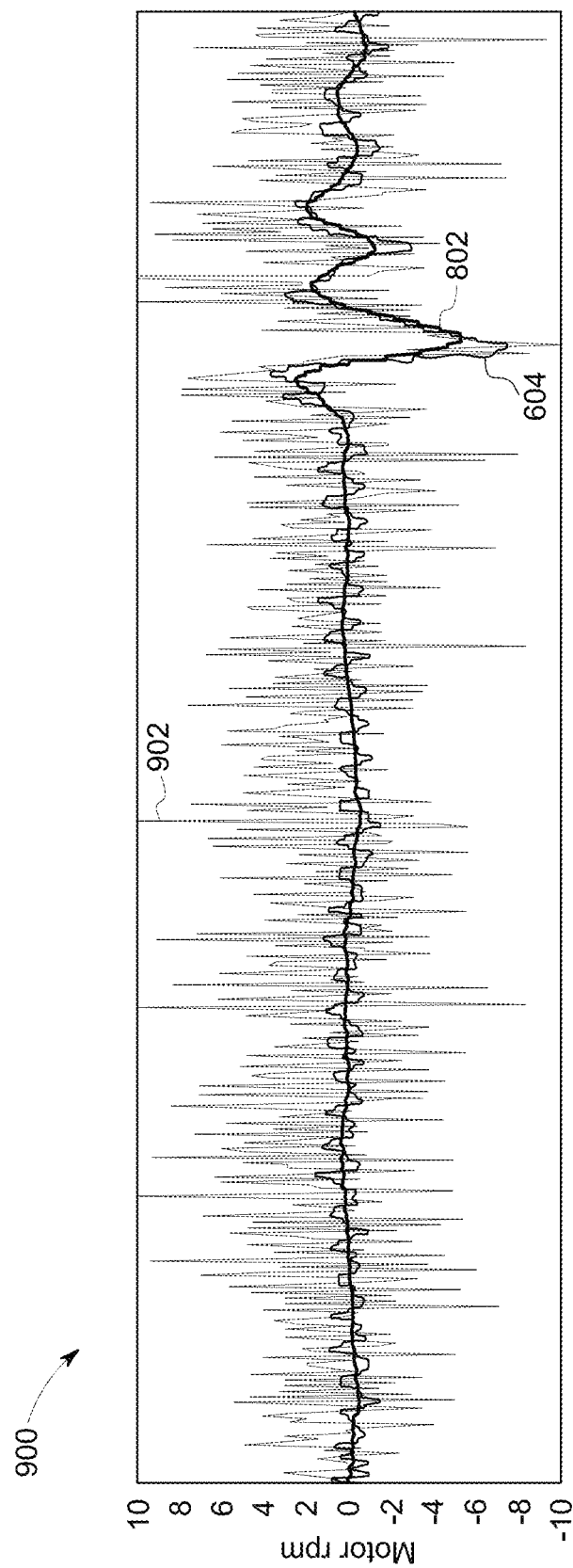
FIG. 9 is a graphical illustration of an embodiment of the spatial array, the gear filtered spatial array, and revolutions per minute spatial array.

Additionally or alternatively, the controller circuit 112 may be configured to scale the sum of incremental delta times represented as the spatial array 604 to a rotational speed of the wheel 104a-d. FIG. 9 is a graphical illustration 900 of an embodiment of the spatial array 604, the gear filtered spatial array 802, and a revolutions per minute (RPM) spatial array 902. The controller circuit 112 may scale the sum of incremental delta times based on the revolutions, utilizing Equation 1, to determine a change in revolutions per minute of the rotor of the motor 110. The variable del_dt may represent the sum of incremental delta time divided by the number of revolutions for a select spatial bucket of the spatial array 604. The variable $RPM_{base}$ may represent the scaling factor of a speed of the motor 110. The variable $dt_{base}$ may represent an amount of time for the pulse signal 402 to reach the controller circuit 112 at the motor speed. It may be noted that the controller circuit 112 may scale the spatial array 604 to a velocity, wheel velocity units, and/or the like.

$$del\_rpm = \frac{-del\_dt \times RPM_{base}}{dt_{base}} \quad \text{(Equation 1)}$$

At 314, the controller circuit 112 may determine whether a wheel defect is present based on the spatial array 604. A localized wheel defect will couple to motion in the drive train components of the motor 110 with a varying level. The degree of coupling depends on many factors including vehicle speed, drivetrain torque levels, and the exact position of the contact which the wheel defect shares with the route 102. The controller circuit 112 may determine the wheel defect based on a morphology (e.g., peak, slope, amplitude, and/or the like) of the spatial array 604 (FIG. 6).

For example, changes in the incremental time delta may correspond to the wheel defect. The controller circuit 112 may be configured to identify a peak 606 of the spatial array 604, which is indicative of the wheel defect. Optionally, the controller circuit 112 may compare the peak 606 to a predetermined threshold to determine if the wheel defect is present. For example, if an amplitude of the peak 606 is greater than the predetermined threshold the controller circuit 112 may determine the wheel defect is present.

Optionally, the predetermined threshold may be dynamic. For example, the predetermined threshold may be adjusted by the controller circuit 112 based on a speed of the vehicle 100, torque levels of the motor 110, a direction of the vehicle 100 traversing the route and/or the like. For example, as the speed of the vehicle 100 and/or torque levels of the motor 110 increases the controller circuit 112 may increase a value of the predetermined threshold.

Figure 10:
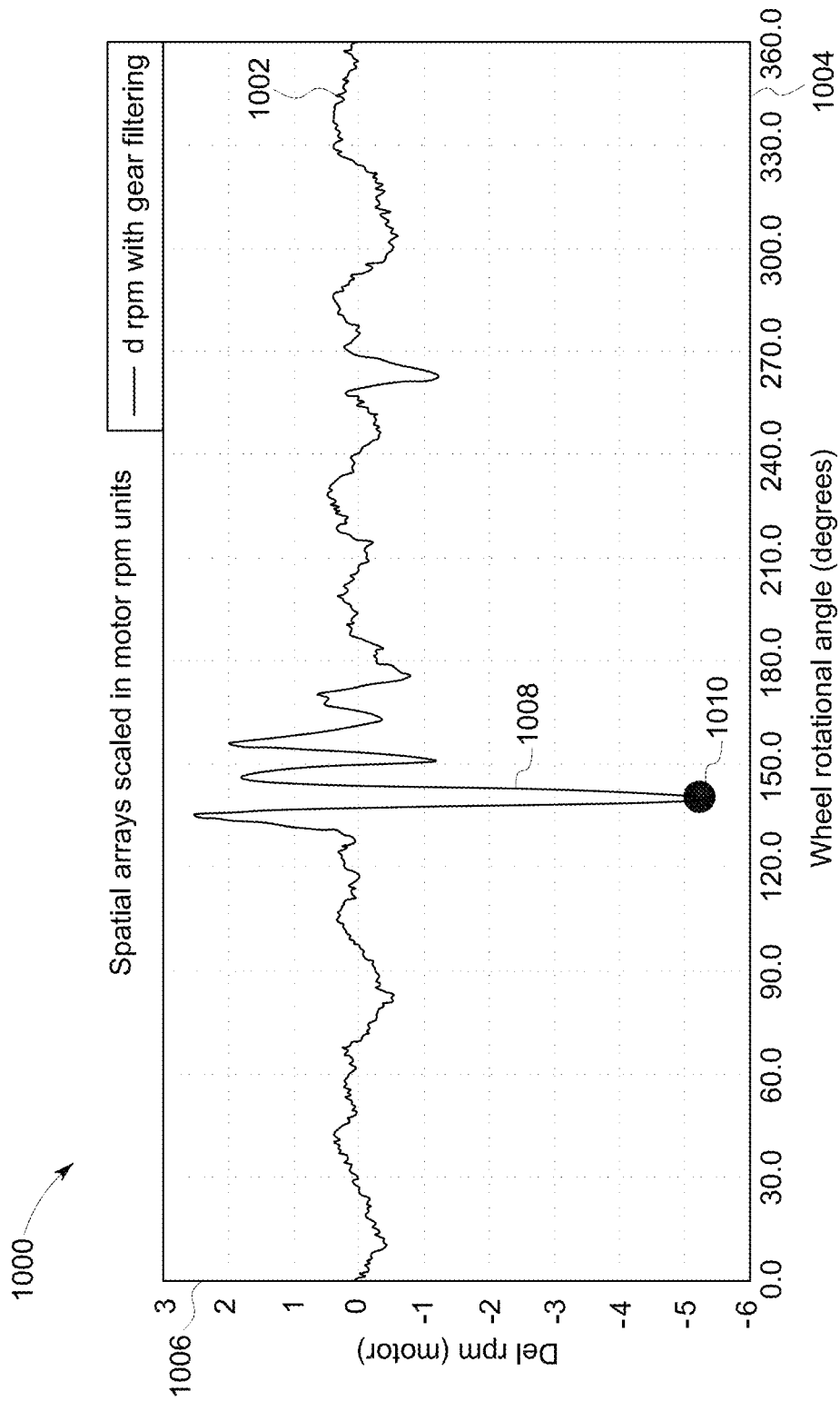
FIGS. 10-12 are graphical illustrations of an embodiment of a revolution per minute spatial array.
Figure 11:
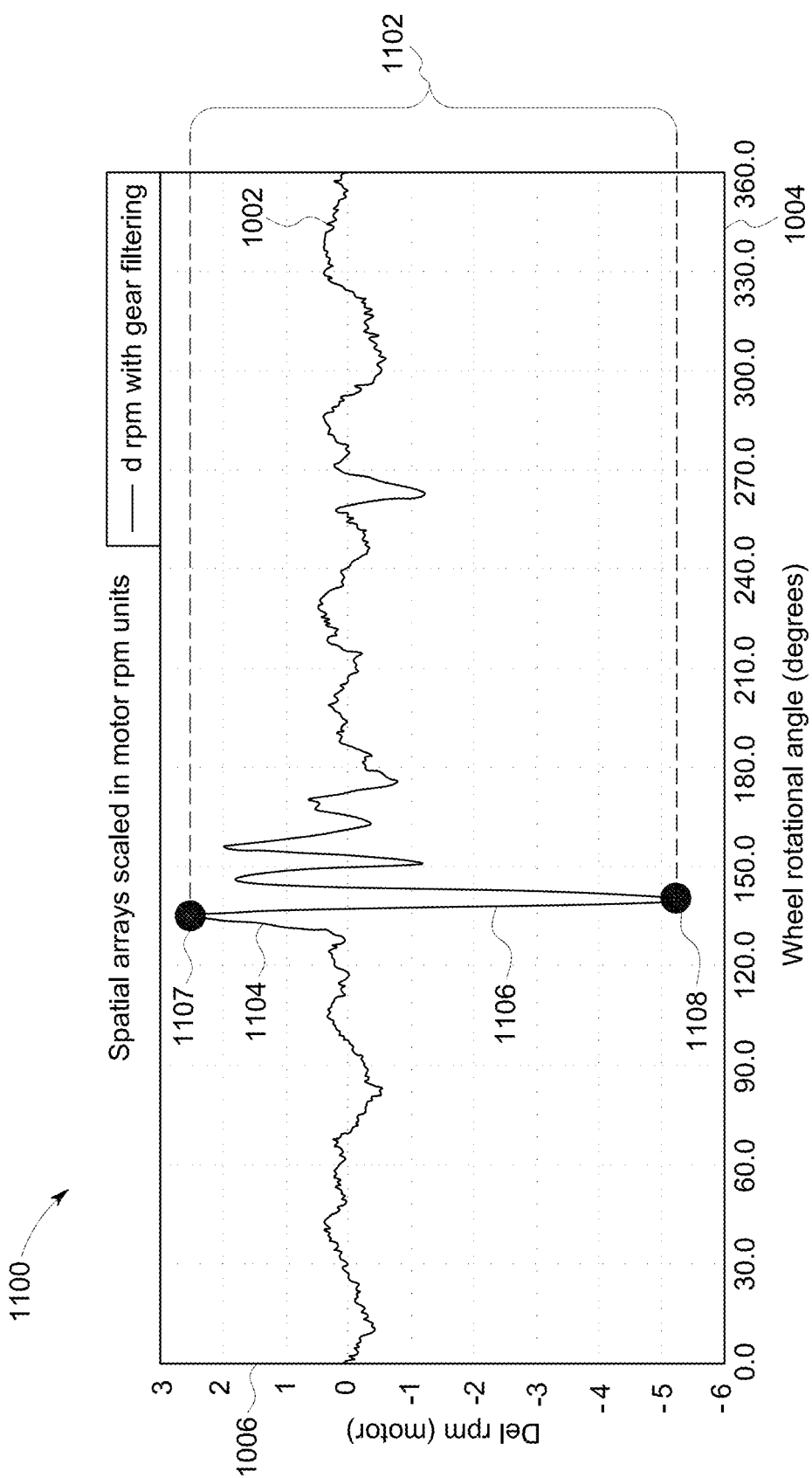
Figure 12:
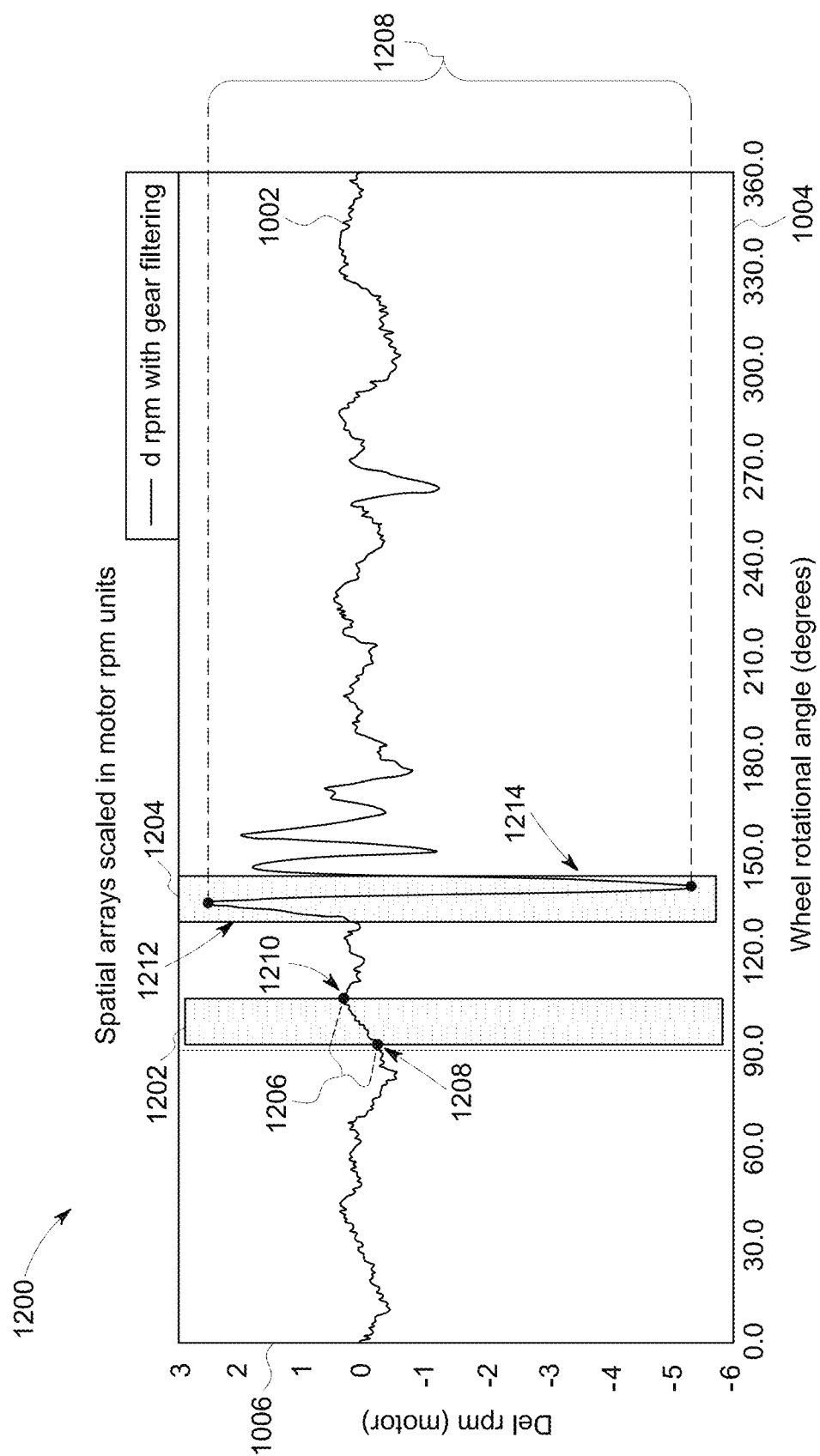

It may be noted that the controller circuit 112, may determine whether a wheel defect is present based on the gear filtered spatial array 802 and/or the RPM spatial array 1002 (FIGS. 10-12). FIGS. 10-12 are graphical illustrations 1000, 1100, 1200 of an embodiment of revolutions per minute (RPM) spatial array 1002. The RPM spatial array 1002 is plotted along a horizontal axis 1004 representing an angular position with respect to the wheel 104a-d (e.g., degrees). The graphical illustrations 1000, 1100, 1200 are shown with a vertical axis 1006 representing a change in RPM. Similar to and/or the same as the spatial array 604, the controller circuit 112 is configured to determine the wheel defect based on a morphology of the RPM spatial array 1002.

For example, the controller circuit 112 may be configured to identify a peak 1008 of the RPM spatial array 1002 (FIG. 10). The controller circuit 112 may identify an amplitude 1010, for example of 5.2. The controller circuit 112 may compare the amplitude 1010 to a predetermined threshold stored in the memory 116. For example, the predetermined threshold may be 3. Based on the amplitude 1010 being greater than the predetermined threshold, the controller circuit may determine that a wheel defect is present.

Additionally or alternatively, the controller circuit 112 may determine whether a wheel defect is present based on a direction of the vehicle 100 traversing along the route 102. For example, when the vehicle 100 is traversing along a turn and/or s-curve of the route 102 the wheel defect may not be in contact with the route 102. The controller circuit 112 may hold and/or wait to identify the defect of the wheel until the vehicle 100 is no longer traversing along the turn and/or s-curve. For example, during the turn and/or s-curve, the controller circuit 112 may be configured to reject the pulse signal.

Optionally, the controller circuit 112 may be configured to determine a severity of the defect based on a magnitude of the peak 1008. For example, the controller circuit 112 determines a magnitude difference between the amplitude 1010 and the predetermined threshold. The difference may be compared to a severity index stored in the memory 116.

In another example, the controller circuit 112 may compare a peak-to-peak of the RPM spatial array 1002 (FIG. 11). Defects (e.g., wheel defect, bearing defect, gear defect) may affect multiple spatial buckets. The controller circuit 112 may compare amplitudes of adjacent peaks 1104, 1106 to identify defects. For example, deviations between magnitudes of adjacent peaks 1104, 1106 may be an indication of the defect severity. The controller circuit 112 may identify adjacent peaks 1104 and 1106 based on slopes of the RPM spatial array 1002. The peaks 1104 and 1106 have amplitudes 1007 and 1108, respectively. The controller circuit 112 may determine a peak-to-peak amplitude 1102 based on the peaks 1104 and 1106. The controller circuit 112 may identify a defect based on the peak-to-peak amplitude 1102. For example, changes in magnitude between the peaks 1104 and 1106 may represent a defect severity. The amplitude 1107 has a different magnitude relative to the amplitude 1108 forming a peak-to-peak amplitude 1102. Based on the peak-to-peak amplitude 1102, the controller circuit 112 may determine a severity of the defect. For example, the controller circuit 112 may compare the peak-to-peak amplitude 1102 with a set of predetermined thresholds, each representing a different severity of the defect. In another example, the controller circuit 112 may compare the peak-to-peak amplitude 1102 with a predetermined threshold. Based on a difference between the peak-to-peak amplitude 1102 and the predetermined threshold, the controller circuit 112 may determine the severity. For example, the greater the difference of the peak-to-peak amplitude 1102 by the controller circuit 112, the controller circuit 112 may determine the severity of the defect is large.

In another example, the controller circuit 112 may compare a peak-to-peak of the RPM spatial array 1002 within spatial windows 1202, 1204. The spatial windows 1202, 1204 may represent a set range of time and/or bandwidth of degrees of the wheel 104*a-d* and/or spatial buckets. A size of the spatial windows 1202, 1204 may be based on a value stored in the memory 116. The controller circuit 112 may compare peaks within the spatial windows 1202, 1204 to detect a defect. For example, the controller circuit 112 may identify the peaks 1208 and 1210 within the spatial window 1202. The controller circuit 112 may identify a peak-to-peak amplitude 1206 based on the peaks 1208 and 1210. The controller circuit 112 may determine that no defect within the spatial window 1202. For example, the controller circuit 112 may compare the peak-to-peak amplitude 1206 with a predetermined threshold stored in the memory 116.

In another example, the controller circuit 112 may identify the peaks 1212 and 1214 within the spatial window 1204. The controller circuit 112 may identify a peak-to-peak amplitude 1208 based on the peaks 1212 and 1214. The controller circuit 112 may determine a defect within the spatial window 1204. For example, the controller circuit 112 may compare the peak-to-peak amplitude 1208 with the predetermined threshold stored in the memory 116.

Optionally, the controller circuit 112 may identify severity of the defect based on pulse signals 402 from alternative sensors 118*a-d*. The controller circuit 112 may compare the location of the defect identified relative to the same location and/or time for the alternative wheels (e.g., 104*a-d*). Based on differences between the peak-to-peak and/or peak magnitudes of the alternative wheels, the controller circuit 112 may determine a severity of the defect.

At 318, the controller circuit 112 may be configured to take a remedial action based on the detection of the wheel defect. The remedial action may represent an alert indicative of the defect, such as taken in response to identifying a severity of the wheel defect. For example, the controller circuit 112 may be configured to generate one or more signals that are communicated to an operator of the vehicle 100 to notify the operator of the identified defect of the wheel 104*a-d*. These signals may be presented on an output device of the vehicle 100, such as a display (e.g., one or more liquid crystal displays (e.g., light emitting diode (LED) backlight), organic light emitting diode (OLED) displays, plasma displays, CRT displays, and/or the like), speaker, and/or the like. Additionally or alternatively, the controller circuit 112 may be configured to generate signals to automatically slow or stop the movement of the vehicle 100 without operator intervention. The controller circuit 112 can generate the signals to be communicated by the communication system 114 to one or more off-board locations, such as a repair facility, to notify the off-board location of the need to further inspect, adjust a maintenance schedule for the vehicle 100, and/or replace the wheel.

The type of remedial action that is taken may vary based on the severity of the defect based on the alert. For example, for larger severity of defect, the controller circuit 112 can automatically implement a more immediate remedial action, such as automatically slowing or stopping the movement of the vehicle without operator intervention. For smaller severity of defect, the analysis system 116 can implement less immediate remedial actions, such as warning the operator of the damaged wheel, notifying the off-board location of a need to further inspect and/or replace the wheel and/or parts of the drivetrain, or the like. Additionally or alternatively, the controller circuit 112 may automatically adjust a duration of a tractive effort of the axles 108 and/or the motor 110 having the defect, a vehicle speed above a set threshold, and/or the like based on the alert. For example, the controller circuit 112 may determine that the tractive effort and/or vehicle speed at above the set threshold may increase a severity of the defect. The controller circuit 112 may be configured to reduce the duration of the tractive effort and/or vehicle speed to increase the use and/or operable lifespan of the component having the defect.

At 324, the controller circuit 112 may be configured to determine a gear spatial array 1412 (FIG. 14) based on grouping sets of the plurality of spatial buckets defined by a summing window. The gear spatial array 1412 is a gear waveform configured to indicate a uniform gear tooth representative of gear teeth, of for example the axle gear 202. Gears of the motor 110 may wear over time, such as aggravated by poor or low lubrication level, high load and speed duty cycles, bearing wear causing mesh alignment loss, and/or the like. For example, wore, misaligned, and/or low lubricated gear mesh will suffer a loss of mesh efficiency and an increase in audible noise and vibration within the motor 110. The gear spatial array 1412 may represent an accumulated gear mesh of the axle gear 202. In connection with FIG. 13, the controller circuit 112 is configured to determine the gear spatial array 1412 based on the spatial array 604.

Figure 13:
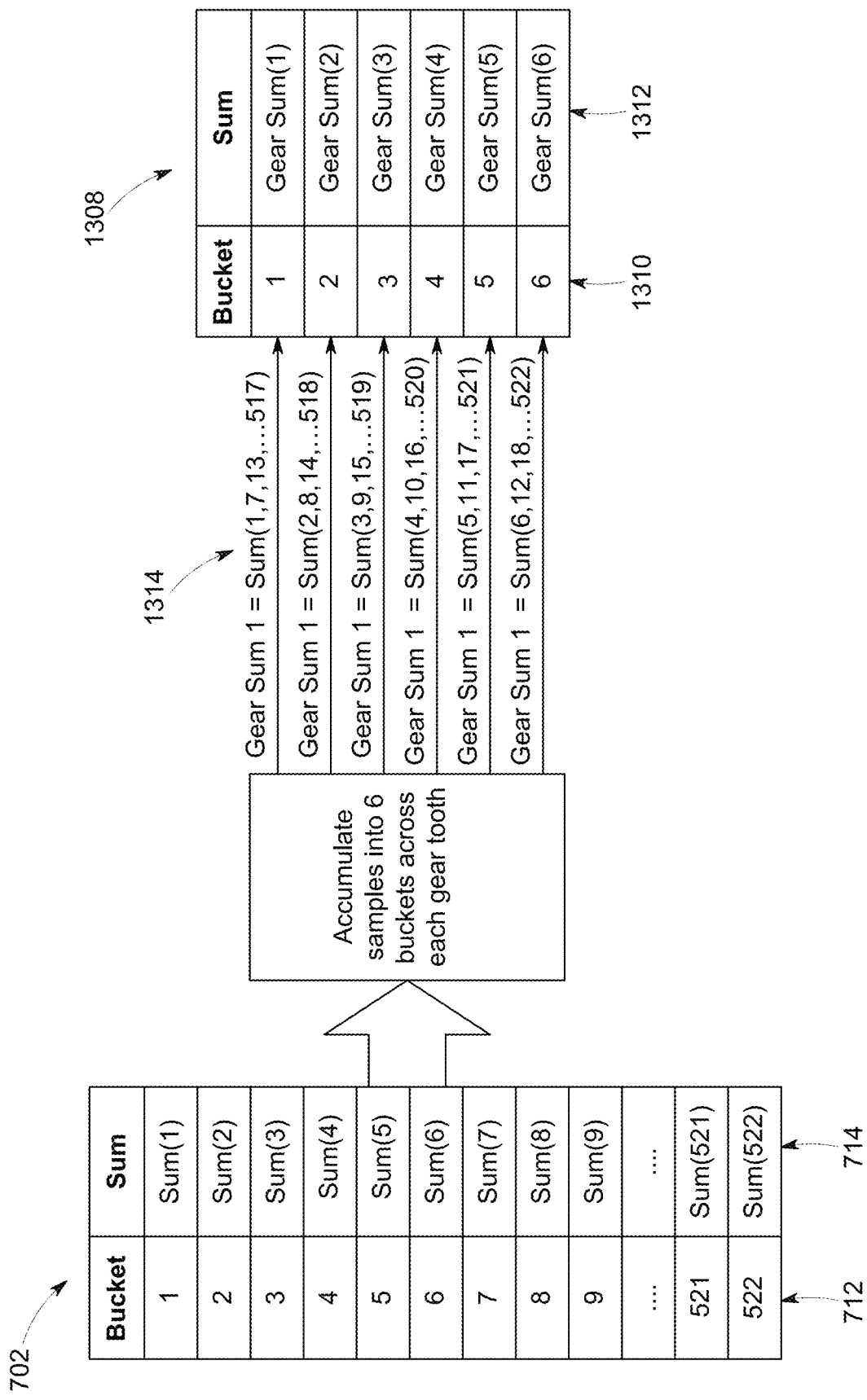
FIG. 13 is an illustration of an embodiment of accumulating incremental delta times into a gear spatial array.

FIG. 13 is an illustration of an embodiment of accumulating incremental delta times into a gear spatial array 1412. Similar to FIG. 7, a portion of the spatial array 604 is shown in the table 702, which may be stored in the memory 116. For example, the column 712 represents the plurality of spatial buckets with an adjacent column 714 that contains the corresponding sum of the incremental delta times. The controller circuit 112 may apportion the spatial buckets in the column 712 corresponding to a position of the gear.

For example, the axle gear 202 may have 87 gear teeth with an axle gear to speed sensor 118 gear ratio of 1/six, which implies six-speed pulses may be available for every axle gear tooth translation. The controller circuit 112 may apportion the sum of incremental delta times in the table 702 into six different gear buckets, shown in column 1310 of the table 1308. The controller circuit 112 may sum the incremental delta times into the column 1312 to form the gear spatial array 1412.

Figure 14:
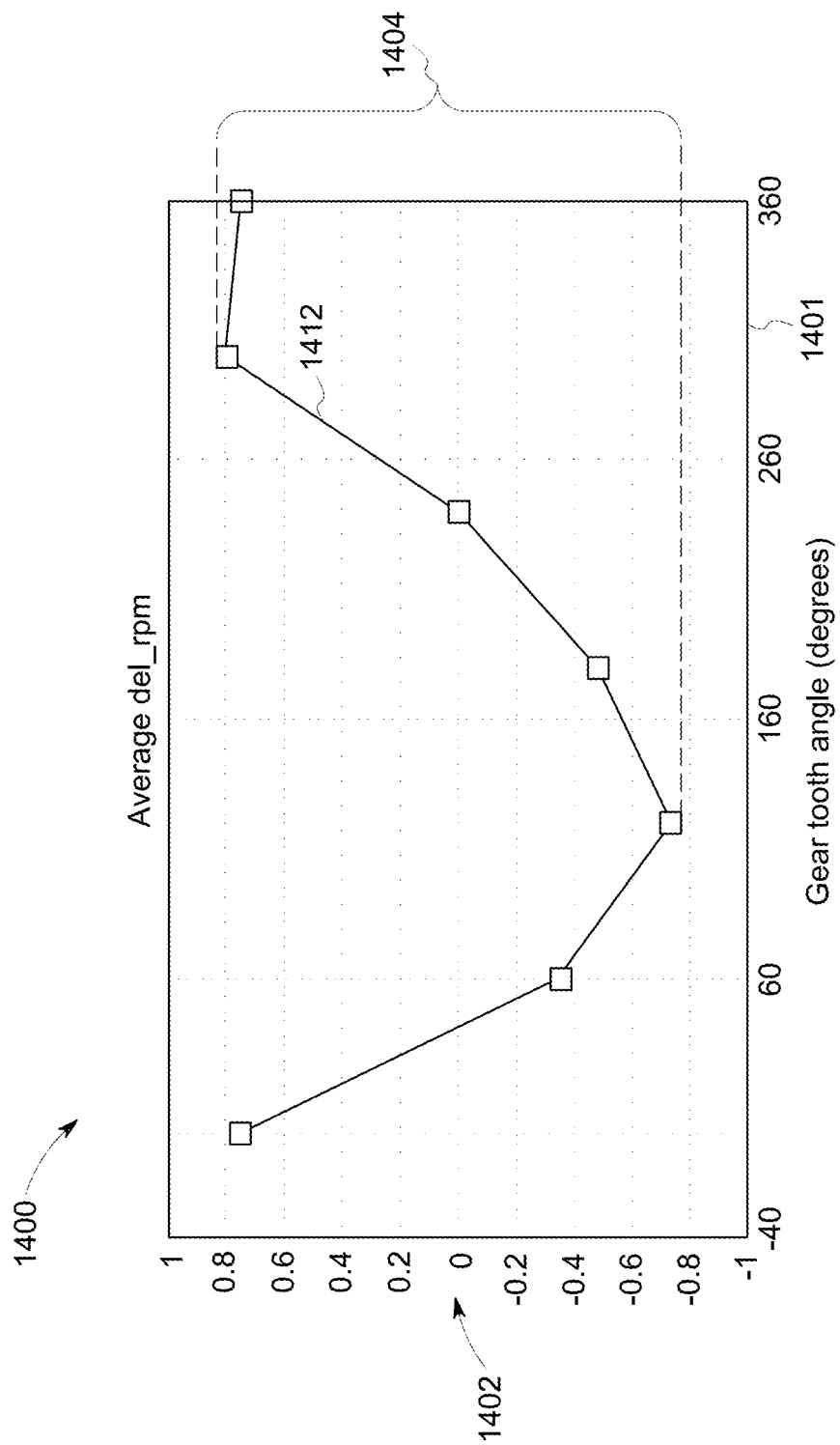
FIG. 14 is a graphical illustration of an embodiment of a gear spatial array.

FIG. 14 is a graphical illustration 1400 of the gear spatial array 1412. The gear spatial array 1412 is shown along a horizontal axis 1401 representing a gear tooth angle. The gear spatial array 1412 is shown with a vertical axis 1402 representing changes in RPM of the motor 110. For example, the controller circuit 112 may scale the gear spatial array 1412 into RPM units. The gear spatial array 1412 is configured to be indicative of the gear mesh of the axle gear 202. For example, the controller circuit 112 may be configured to determine peak-to-peaks 1404 of the gear spatial array 1412. The peak-to-peaks 1404 relates to gear mesh vibration or unhealthy of the gear (e.g., the axle gear 202) and/or the bearings 208, 210, 212, 214.

At 326, the controller circuit 112 may be configured to determine whether a change in the gear spatial array 1412 between different revolution sets relative to a predetermined threshold. The different revolution sets may represent different incremental delta times acquired at different groupings of revolutions. The controller circuit 112 may compare gear spatial arrays 1412 acquired at the different revolution sets. For example, the controller circuit 112 may compare the peak-to-peaks 1404 of the gear spatial arrays 1412 acquired at different revolution sets. The differences between the peak-to-peaks 1404 may be compared with a predetermined threshold stored in the memory 116. For example, the predetermined threshold may represent a percentage and/or magnitude of change between the peak-to-peaks 1404. When the changes in the peak-to-peaks 1404 are greater than the predetermined threshold, the controller circuit 112 may be configured to determine that a gear defect and/or bearing defect is present.

Additionally or alternatively, the controller circuit 112 may be configured to determine defects of the bearings 208, 210, 212, 214, the pinion gear 208, the speed sensor gear 216, the axle gear 202, rotor imbalance, pedestal liner, traction link defect, and/or the like. Optionally, the bearings 208, 210, 212, 214, the pinion gear 208, the speed sensor gear 216, the axle gear 202, rotor imbalance may be determined by the controller circuit 112 based on a morphology of the spatial array 604 (FIG. 6) and/or the gear spatial array 1412 (FIG. 14).

For example, the controller circuit 112 may be configured to determine the defect corresponds and/or localized to the pinion gear 208, inner bearing (e.g., the bearings 208, 210 shown in FIG. 2B) and/or the speed sensor gear 216 based on a width of a peak in the spatial array 604. The controller circuit 112 may be configured to identify a peak (e.g., the peak 606) within the spatial array 604 along a revolution of the wheel 104 and/or motor revolution. The controller circuit 112 may measure a width of the identified peak across the spatial buckets along the horizontal axis 602. For example, the width of the identified peak cross over a plurality of spatial buckets. The controller circuit 112 may compare the width of the identified peak to a width threshold indicative of a narrow angular signature. The narrow angular signature may correspond to less than ten spatial buckets (e.g., two, three, five, and/or the like). The controller circuit 112 may assign an integral number of spatial buckets across the motor rotation represented by the spatial array 604 within which the delta speed or delta time between angular positions is accumulated for the purposes of developing an average for each bucket.

In another example, the controller circuit 112 may be configured to determine the defect corresponds to rotor imbalance based on a width of a peak in the spatial array 604. The controller circuit 112 may be configured to identify a peak (e.g., the peak 606) within the spatial array 604 along a revolution of the wheel 104 and/or motor revolution. The controller circuit 112 may measure a width of the identified peak across the spatial buckets along the horizontal axis 602. For example, the width of the identified peak cross over a plurality of spatial buckets. The controller circuit 112 may compare the width of the identified peak to a width threshold indicative of a broad spatial angular signature. The broad spatial angular signature may correspond to over ten spatial buckets (e.g., fifteen, twenty, thirty, and/or the like). The controller circuit 112 may assign an integral number of spatial buckets across the motor rotation represented by the spatial array 604 within which the delta speed or delta time between angular positions is accumulated for the purposes of developing the average for each bucket.

Optionally, the integral number of spatial bucks are spread across various roller or roller cage expected rotations which are directly related to the motor speed. Additionally or alternatively, the detection by the controller circuit 112 of a defect on the pinion gear 208, inner bearing (e.g., the bearings 208, 210), or a rotor imbalance may be configured to assign an integral number of spatial buckets across the motor rotation of the spatial array 604 within which variations for additional sensors coupled to the motors 110. For example, the additional sensors may include at least one of a motor current sensor, a voltage sensor, an accelerometer, and/or the like is accumulated for the purposes of developing the average for the spatial buckets.

In another example, the controller circuit 112 may be configured to identify an outer race bearing defect (e.g., the bearings 212, 214) based on a morphology of the spatial array 604 (FIG. 6) and/or the gear spatial array 1412 (FIG. 14). The controller circuit 112 may identify a width of a peak (e.g., the peak 606) having a width across a plurality of spatial buckets corresponding to a bearing width. The bearing width may represent a number of spatial buckets corresponding to an angular width of the wheel 104 corresponding to a rolling bearing (e.g., the bearings 212, 214) of the wheel 104 and/or motor revolution. When the width of the identified peak has a bearing width, the controller circuit may be configured to determine an outer race bearing defect.

If the controller circuit 112 determines the gear change is above the threshold, then at 328, the controller circuit 112 may take a remedial action based on the detection of the gear defect. The remedial action may represent an alert indicative of the defect. For example, the controller circuit 112 may be configured to generate one or more signals that are communicated to an operator of the vehicle 100 to notify the operator of the identified defect of the bearing and/or gear. These signals may be presented on an output device of the vehicle 100, such as a display (e.g., one or more liquid crystal displays (e.g., light emitting diode (LED) backlight), organic light emitting diode (OLED) displays, plasma displays, CRT displays, and/or the like), speaker, and/or the like. Additionally or alternatively, the controller circuit 112 may be configured to generate signals to automatically slow or stop movement of the vehicle 100 without operator intervention. The controller circuit 112 can generate the signals to be communicated by the communication system 114 to one or more off-board locations, such as a repair facility, to notify the off-board location of the need to further inspect, adjust a maintenance schedule for the vehicle 100, and/or replace the bearing and/or gear.

The type of remedial action that is taken may vary based on the severity of the defect and the alert. For example, the controller circuit 112 may determine that magnitude of the differences between the peak-to-peaks 1412 relative to the predetermined threshold is indicated of the severity of the defect of the bearing and/or gear. For larger severity of defect, the controller circuit 112 can implement a more immediate remedial action, such as automatically slowing or stopping the movement of the vehicle without operator intervention. For smaller severity of defect, the analysis system 116 can implement less immediate remedial actions, such as warning the operator of the damaged bearing and/or gear, notifying the off-board location of a need to further inspect and/or replace the bearing or gear, and/or the like. Additionally or alternatively, the controller circuit 112 may automatically adjust a duration of a tractive effort of the axles 108 and/or the motor 110 having the defect, a vehicle speed above a set threshold, and/or the like based on the alert. For example, the controller circuit 112 may determine that the tractive effort and/or vehicle speed at above the set threshold may increase a severity of the defect. The controller circuit 112 may be configured to reduce the duration of the tractive effort and/or vehicle speed to increase the use and/or operable lifespan of the component having the defect.

In an embodiment a system (e.g., monitoring system) is provided. The system includes a speed sensor coupled to a traction motor of an axle drive train of a vehicle. The speed sensor is configured generate a pulse signal indicative of a rotational position of the traction motor. The system includes a controller circuit operatively coupled to the speed sensor. The controller circuit is configured to analyze the pulse signal to identify per-revolution signal reoccurrences that meet designated criteria, and to determine the defect based on the per-revolution signal reoccurrences that are identified. The defect is one or more of a wheel defect, a bearing defect, or a gear defect.

Optionally, the controller circuit is configured to calculate a delta time or delta speed for a plurality of spatial buckets based on the pulse signal, and determine an incremental delta time or delta speed for the plurality of spatial buckets based on the delta time and an average delta time or delta speed of the pulse signal. The controller circuit is configured to use the incremental delta time or delta speed to determine the defect. Additionally or alternatively, the controller circuit is configured to determine a sum incremental delta time or delta speed for the plurality of spatial buckets based on a number of rotations of a wheel. Additionally or alternatively, the controller circuit is configured to determine a gear filtered spatial array based on grouping sets of the plurality of spatial buckets defined by a summing window. Additionally or alternatively, the controller circuit is configured to scale the sum incremental delta time to a rotational speed of the wheel or the traction motor. Additionally or alternatively, the controller circuit is configured to remove or filter out gear meshing variation by spatially averaging the signals over an integral number of gear teeth.

Optionally, the controller circuit is configured to generate a spatial array based on the pulse signal, and to determine the defect based on a morphology of the spatial array. Additionally or alternatively, the controller circuit is configured to determine a severity of the defect based on a magnitude of the peak.

Optionally, the controller circuit is configured to generate an alert indicative of the defect. Additionally or alternatively, the controller circuit is configured to automatically adjust at least one of the speed of a vehicle, alert an operator of the vehicle, or a maintenance schedule of the vehicle responsive to determining the defect based on the alert. Additionally or alternatively, the controller circuit is configured to automatically adjust a tractive effort duration of an axle having the defect or a vehicle speed based on the alert.

In an embodiment a method (e.g., for monitoring an axle drive train) is provided. The method includes receiving a pulse signal from a speed sensor coupled to a traction motor. The pulse signal is indicative of a rotational position of the traction motor. The method includes analyzing the pulse signal to identify per-revolution signal reoccurrences that meet designated criteria, and determining a defect based on the per-revolution signal reoccurrences that are identified. The defect is one or more of a wheel defect, a bearing defect, or a gear defect.

Optionally, the method includes calculating a delta time for a plurality of spatial buckets based on the pulse signal, and determining an incremental delta time for the plurality of spatial buckets based on the delta time and an average delta time of the pulse signal. The incremental delta time is used to determine the defect. Additionally or alternatively, the method includes determining a sum incremental delta time for the plurality of spatial buckets based on a number of rotations of a wheel. Additionally or alternatively, the method includes determining a gear filtered spatial array based on grouping sets of the plurality of spatial buckets defined by a summing window. Additionally or alternatively, the method includes filtering out gear meshing variation by spatially averaging the signals over an integral number of gear teeth. Additionally or alternatively, the method includes scaling the sum incremental delta time to a rotational speed of the wheel.

Optionally, the method includes generating a spatial array based on the pulse signal, and determining a defect based on a morphology of the spatial array. Additionally or alternatively, the method includes determining a severity of the defect based on a magnitude of the peak.

Optionally, the method includes generating an alert indicative of the defect. Additionally or alternatively, the method includes automatically adjusting at least one of a speed of a vehicle, alert an operator of the vehicle, or a maintenance schedule of the vehicle based on the alert.

In an embodiment a system (e.g., monitoring system) is provided. The system includes a controller circuit configured to receive a signal from a speed sensor of a vehicle. The signal representative of rotational positions of a motor of the vehicle. The controller circuit is configured to analyze the signal to identify per-revolution signal reoccurrences that meet designated criteria, and to determine the defect based on the per-revolution signal reoccurrences that are identified in one or more of a wheel of the vehicle, a bearing of the vehicle, or a gear of the vehicle based on the signal.

Optionally, the controller circuit is configured to automatically reduce a speed of the vehicle responsive to determining the defect.

Multiple instances of "one or more processors" does not mean the systems are embodied in different processors, although that is a possibility. Instead, the one or more processors of the systems described herein may be the same as the one or more processors of the same or different system, such that in one embodiment, different systems can be embodied in the same processor or the same multiple processors.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the generation and/or analysis of the speed signatures may take into account a large amount of factors, may rely on relatively complex computations, and the like, such that such a person cannot complete the analysis of the speed signatures within a commercially reasonable time period.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single or multiple pieces of hardware (for example, electronic circuits and/or circuitry that include and/or are connected with one or more processors, microcontrollers, random access memories, hard disks, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
    a speed sensor coupled to a traction motor of an axle drive train of a vehicle, wherein the speed sensor is configured to generate a pulse signal indicative of a rotational position of the traction motor;
    a controller circuit operatively coupled to the speed sensor, the controller circuit configured to determine a spatial array of one or more of a wheel or an axle of the vehicle operably coupled with the axle drive train, the spatial array representing a plurality of spatial buckets, each spatial bucket representing an angular position of the one or more of the wheel or axle,
    the controller circuit configured to analyze the pulse signal based on the plurality of spatial buckets to identify per-revolution signal reoccurrences that meet designated criteria to determine a defect of one or more of the wheel, a bearing, or a gear, the per-revolution signal reoccurrences indicating the pulse signal associated with each of the corresponding spatial buckets of the spatial array and the corresponding angular position of the one or more of the wheel or the axle based on a location of each spatial bucket, and
    and
    wherein the controller circuit is configured to automatically adjust a tractive effort duration of an axle having the defect or a vehicle speed responsive to determining the defect.

2. The system of claim of claim 1, wherein the controller circuit is configured to calculate a delta time or delta speed of the plurality of spatial buckets based on the pulse signal, and determine an incremental delta time or delta speed of the plurality of spatial buckets based on the delta time and an average delta time or delta speed of the pulse signal, wherein the controller circuit is configured to use the incremental delta time or delta speed to determine the defect.

3. The system of claim 2, wherein the controller circuit is configured to determine a sum incremental delta time or delta speed of the plurality of spatial buckets based on a number of rotations of the wheel.

4. The system of claim 3, wherein the controller circuit is configured to determine a gear filtered spatial array based on grouping sets of the plurality of spatial buckets defined by a summing window.

5. The system of claim 3, wherein the controller circuit is configured to scale the sum incremental delta time to a rotational speed of the wheel or the traction motor.

6. The system of claim 1, wherein the controller circuit is configured to determine the spatial array based on the pulse signal, and to determine the defect based on a morphology of the spatial array, and the controller circuit is configured to determine a severity of the defect based on a magnitude of a peak.

7. The system of claim 1, wherein the controller circuit is configured to generate an alert indicative of the defect.

8. The system of claim 1, wherein the controller circuit is configured to automatically perform at least one of adjust the speed of a vehicle, alert an operator of the vehicle, or adjust a maintenance schedule of the vehicle responsive to determining the defect.

9. A method comprising:
receiving a pulse signal from a speed sensor coupled to a traction motor, wherein the pulse signal is indicative of a rotational position of the traction motor;
determining a spatial array of one or more of a wheel or an axle of a vehicle operably coupled with the traction motor, the spatial array representing a plurality of spatial buckets, each spatial bucket representative of an angular position of the one or more of the wheel or the axle;
analyzing the pulse signal based on the plurality of spatial buckets to identify per-revolution signal reoccurrences that meet designated criteria to determine a defect of one or more of the wheel, a bearing, or a gear, the per-revolution signal reoccurrences indicating the pulse signal associated with each of the corresponding spatial buckets of the spatial array and the corresponding angular position of the one or more of the wheel or the axle based on a location of each spatial bucket; and
automatically changing a speed of the vehicle responsive to determining the defect.

10. The method of claim 9, further comprising calculating a delta time of the plurality of spatial buckets based on the pulse signal.

11. The method of claim 9, further comprising determining a sum of incremental delta time of the plurality of spatial buckets based on the delta time and an average delta time of the pulse signal, wherein the incremental delta time is used to determine the defect.

12. The method of claim 11, wherein the sum of incremental delta time of the plurality of spatial buckets is further determined based on a number of rotations of the wheel.

13. The method of claim 9, further comprising determining a gear filtered spatial array based on grouping sets of the plurality of spatial buckets defined by a summing window.

14. The method of claim 11, further comprising scaling the sum of incremental delta time to a rotational speed of the wheel or the traction motor.

15. The method of claim 9, further comprising determining the spatial array based on the pulse signal, determining the defect based on a morphology of the spatial array, and determining a severity of the defect based on a magnitude of a peak, and generating an alert indicative of the defect.

16. The method of claim 9, further comprising automatically performing at least one of alerting an operator of the vehicle, or adjusting a maintenance schedule of the vehicle responsive to determining the defect.

17. A system comprising:
a controller circuit configured to receive a signal from a speed sensor of a vehicle, the signal representative of rotational positions of a motor of the vehicle, wherein the controller circuit is configured to determine a plurality of spatial buckets, each spatial bucket representing an angular position the motor,
the controller circuit configured to analyze the signal based on the plurality of spatial buckets to identify per-revolution signal reoccurrences that meet designated criteria to determine a defect of one or more of a wheel, a bearing of the vehicle, or a gear of the vehicle, the per-revolution signal reoccurrences identifying at least one of the spatial buckets where the designated criteria is met and a corresponding angular position of the motor based on a location of the at least one spatial bucket, wherein the controller circuit is configured to automatically reduce a speed of the vehicle responsive to determining the defect.

18. The method of claim 9, further comprising:
calculating a delta time of the plurality of spatial buckets based on the pulse signal, the delta time representative of an amount of time between one or more teeth of a gear of the speed sensor;
determining a sum of incremental delta time of the plurality of spatial buckets based on the delta time and a number of rotations of the wheel, wherein the spatial array includes the sum of the incremental delta time of the plurality of spatial buckets for plural revolutions of the traction motor; and
determining a gear filtered spatial array based on grouping sets of the plurality of spatial buckets together and defined by a summing window, the summing window based on a number of spatial buckets representing at least one tooth of an axle gear of the one or more of the wheel or the axle of the vehicle, wherein a number of spatial buckets within at least one grouping set of the plurality of spatial buckets is based on a size of the at least one tooth of the axle gear and an angular position of the at least one tooth of the axle gear relative to the angular position of each spatial bucket within the at least one grouping set of the plurality of spatial buckets.

* * * * *